(12) United States Patent
Christmas et al.

(10) Patent No.: US 12,126,944 B2
(45) Date of Patent: *Oct. 22, 2024

(54) HOLOGRAPHIC PROJECTION

(71) Applicant: Dualitas Ltd, Milton Keynes (GB)

(72) Inventors: Jamieson Christmas, Milton Keynes (GB); Michal Wengierow, Knowlhill (GB); Nicu Gavrila, Knowlhill (GB)

(73) Assignee: Dualitas Ltd (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/204,303

(22) Filed: May 31, 2023

(65) Prior Publication Data

US 2023/0308620 A1 Sep. 28, 2023

Related U.S. Application Data

(63) Continuation of application No. 17/000,845, filed on Aug. 24, 2020, now Pat. No. 11,765,328.

(30) Foreign Application Priority Data

Aug. 23, 2019 (GB) ..................................... 1912168

(51) Int. Cl.
*H04N 9/31* (2006.01)
*G03H 1/28* (2006.01)
*G03H 1/30* (2006.01)

(52) U.S. Cl.
CPC ............ *H04N 9/3179* (2013.01); *G03H 1/28* (2013.01); *G03H 1/30* (2013.01); *H04N 9/3141* (2013.01);
(Continued)

(58) Field of Classification Search
None
See application file for complete search history.

(56) References Cited

U.S. PATENT DOCUMENTS 6,246,796 B1 * 6/2001 Horikoshi ............ G03H 1/2294
375/E7.184
11,480,919 B2 10/2022 Wengierow
(Continued)

FOREIGN PATENT DOCUMENTS

CN 108287414 A 7/2018
GB 2455523 A 6/2009
(Continued)

OTHER PUBLICATIONS

UKIPO Combined Search and Examination Report under Sections 17 & 18(3), GB Application No. 1912168.0, mailed Feb. 25, 2020, 6 pages.
(Continued)

*Primary Examiner* — John W Miller
*Assistant Examiner* — Sean N. Haiem
(74) *Attorney, Agent, or Firm* — McDonnell Boehnen Hulbert & Berghoff LLP

(57) ABSTRACT

A holographic projector comprises an image processing engine, a hologram engine, a display engine and a light source. The image processing engine is arranged to receive a source image for projection and generate a plurality of secondary images from a primary image based on the source image. The source image comprises pixels. Each secondary image may comprise fewer pixels than the source image. The plurality of secondary images are generated by sampling the primary image. The hologram engine is arranged to determine, such as calculate, a hologram corresponding to each secondary image to form a plurality of holograms. The display engine is arranged to display each hologram on the display device. The light source is arranged to Illuminate each hologram during display to form a holographic reconstruction corresponding to each secondary image on a replay
(Continued)

plane. The primary image is selected from the group comprising: the source image and an intermediate image.

21 Claims, 23 Drawing Sheets

(52) U.S. Cl.
CPC ... *G03H 2001/303* (2013.01); *G03H 2225/12* (2013.01); *G03H 2226/02* (2013.01)

(56) References Cited

U.S. PATENT DOCUMENTS

| | | | | |
|---|---|---|---|---|
| 2002/0008887 | A1* | 1/2002 | Horikoshi | G03H 1/2294 |
| | | | | 359/9 |
| 2003/0090752 | A1 | 5/2003 | Rosenberger | |
| 2004/0001625 | A1* | 1/2004 | Curry | G06T 7/194 |
| | | | | 382/173 |
| 2005/0280894 | A1* | 12/2005 | Hartkop | H04N 13/31 |
| | | | | 359/464 |
| 2010/0046830 | A1* | 2/2010 | Wang | G06T 7/12 |
| | | | | 382/164 |
| 2010/0149139 | A1* | 6/2010 | Kroll | G03H 1/0443 |
| | | | | 345/204 |
| 2011/0128407 | A1* | 6/2011 | Lelescu | H04N 25/611 |
| | | | | 382/167 |
| 2011/0254916 | A1* | 10/2011 | Fan | G02B 30/52 |
| | | | | 348/E13.026 |
| 2013/0106847 | A1* | 5/2013 | Sugiyama | G02B 27/0103 |
| | | | | 345/419 |
| 2013/0265622 | A1 | 10/2013 | Christmas | |
| 2014/0104487 | A1* | 4/2014 | Bridge | H04N 23/71 |
| | | | | 348/370 |
| 2014/0253987 | A1 | 9/2014 | Christmas | |
| 2015/0022526 | A1* | 1/2015 | Christmas | G02B 27/0101 |
| | | | | 345/428 |
| 2017/0082855 | A1 | 3/2017 | Christmas | |
| 2017/0115627 | A1 | 4/2017 | Christmas | |
| 2017/0363869 | A1 | 12/2017 | Christmas | |
| 2018/0046138 | A1* | 2/2018 | Christmas | B60Q 1/085 |
| 2018/0120768 | A1* | 5/2018 | Christmas | G03H 1/02 |
| 2018/0129166 | A1* | 5/2018 | Seo | G03H 1/268 |
| 2018/0188532 | A1 | 7/2018 | Christmas | |
| 2019/0004476 | A1 | 1/2019 | Mullins | |
| 2019/0041641 | A1 | 2/2019 | Christmas | |
| 2019/0064738 | A1 | 2/2019 | Cole | |
| 2020/0041957 | A1 | 2/2020 | Mullins | |
| 2020/0081262 | A1* | 3/2020 | Tan | G03H 1/22 |
| 2020/0150587 | A1* | 5/2020 | Choi | G03H 1/2286 |
| 2020/0150588 | A1* | 5/2020 | Seo | G03H 1/32 |
| 2020/0183209 | A1* | 6/2020 | Gao | G02F 1/13306 |

FOREIGN PATENT DOCUMENTS

| | | |
|---|---|---|
| GB | 2496108 A | 5/2013 |
| GB | 2526275 A | 11/2015 |
| GB | 2554575 A | 4/2018 |
| GB | 2567409 A | 4/2019 |
| GB | 2567510 A | 4/2019 |
| GB | 2569206 A | 6/2019 |
| GB | 2569208 A | 6/2019 |
| JP | 2006212696 A | 8/2006 |
| JP | 2007-206356 A | 8/2007 |
| KR | 10-2005-0091541 A | 9/2005 |
| KR | 10-2011-0042319 A | 4/2011 |
| KR | 10-2019-0053839 A | 5/2019 |
| WO | 2018078366 A1 | 5/2018 |
| WO | 2018100394 A1 | 6/2018 |

OTHER PUBLICATIONS

Wang, H., et al., "A Study of Image Fusion Based on Multiwavelet Transform," Journal of Image and Graphics, vol. 9, No. 8, pp. 1002-1007, Aug. 2004.

Zhang, Z., eg al., "Subpixel Edge Detection of Workpiece Based on Improved Partial Area Gray Feature," Software Guide, vol. 18, No. 6, pp. 158-162, Jun. 2019.

* cited by examiner

FIGURE 6

| P11 | P12 | P13 | P14 | | | | | | | | | | | | |
|-----|-----|-----|-----|--|--|--|--|--|--|--|--|--|--|--|--|
| P21 | P22 | P23 | P24 | | | | | | | | | | | | |
| P31 | P32 | P33 | P34 | | | | | | | | | | | | |
| P41 | P42 | P43 | P44 | | | | | | | | | | | | |

700

| A11 | A12 | A13 | A14 |
|-----|-----|-----|-----|
| A21 | A22 | A23 | A24 |
| A31 | A32 | A33 | A34 |

HOLOGRAPHIC PROJECTION

CROSS REFERENCE TO RELATED APPLICATIONS

This application is a continuation of U.S. patent application Ser. No. 17/000,845, filed Aug. 24, 2020, which claims the benefit of priority of United Kingdom Patent Application no. 1912168.0, filed Aug. 23, 2019, each of which is hereby incorporated herein by reference in its entirety.

FIELD

The present disclosure relates to an image processor and a projector. More specifically, the present disclosure relates to a holographic projector, a holographic projection system and an image processor for holographic projection. The present disclosure further relates to a method of holographically projecting a target image and a method of holographically projecting video images. Some embodiments relate to a head-up display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram, "CGH", may be calculated by a technique based on a mathematical transformation such as a Fresnel or Fourier transform. These types of holograms may be referred to as Fresnel or Fourier holograms. A Fourier hologram may be considered a Fourier domain representation of the object or a frequency domain representation of the object. A CGH may also be calculated by coherent ray tracing or a point cloud technique, for example.

A CGH may be encoded on a spatial light modulator, "SLM", arranged to modulate the amplitude and/or phase of incident light. Light modulation may be achieved using electrically-addressable liquid crystals, optically-addressable liquid crystals or micro-mirrors, for example.

The SLM may comprise a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The SLM may be reflective meaning that modulated light is output from the SLM in reflection. The SLM may equally be transmissive meaning that modulated light is output from the SLM is transmission.

A holographic projector for imaging may be provided using the described technology. Such projectors have found application in head-up displays, "HUD", and head-mounted displays, "HMD", including near-eye devices, for example.

A holographic projector projects an image onto a replay field on a replay plane. When using the described technology, the projected image is formed from a hologram displayed on pixels of the SLM, herein referred to as "SLM pixels". Thus, the SLM pixels display pixels of the hologram, herein referred to as "hologram pixels". The projected image is formed of "image spots" which are also referred to herein as "image pixels". The image pixels have a finite size and adjacent image pixels in the replay field can interfere or blur together. This is referred to herein as pixel crosstalk. The problem of pixel crosstalk leads to reduced image quality.

Furthermore, a hologram engine takes time to determine a hologram for display from a source image. For example, the hologram may be a Fourier hologram calculated using at least one Fourier transform. The time taken to calculate the hologram can therefore limit the rate at which holograms can be written to the SLM and thus the rate at which a sequence of source images can be projected as a video stream, herein called the "frame rate". Thus, it can be difficult to project images at acceptable video frame rates.

The present disclosure concerns techniques for implementing time interlacing to optimise the resolution of the holographic reconstruction of a source image on the replay plane. Some embodiments disclosed herein involve image sampling or sub-sampling of upscaled images and some embodiments involve efficiently compensating for the warping caused by an optical system used to image the holographic reconstruction.

There is disclosed herein an improved holographic projection system and method.

SUMMARY

Aspects of the present disclosure are defined in the appended independent claims.

There is disclosed herein a holographic projector arranged to holographically-reconstruct a target image by projection. The holographic projector comprises an image processing engine, a hologram engine, a display engine and a light source. The image processing engine may be arranged to receive a source image or a target image. The image processing engine may be arranged to upscale the target image to form the source image. The source image comprises pixels. The image processing engine is arranged to generate a plurality of secondary images by sampling a primary image, which is based on the source image. For example, the primary image may be selected from the group comprising the source image and an intermediate image derived from the source image. Each secondary image may comprise fewer pixels than the source image. The hologram engine is arranged to determine, such as calculate, a hologram corresponding to each secondary image to form a plurality of holograms. The display engine is arranged to display each hologram on a display device. Each hologram may be displayed in turn on a display device. Alternatively, or additionally, two or more display devices or two or more zones or areas within the same display device may be provided, to display two or more respective holograms substantially concurrently. The light source is arranged to illuminate each hologram during display to form a holographic reconstruction corresponding to each secondary image on a replay plane.

The upscaling of a target image to form the source image may comprise repeating each pixel value of the target image in respective contiguous group of pixels of the source image, wherein there is a positional correspondence between each pixel of the target image and the corresponding group of pixels of the source image having the same pixel value.

Each secondary image may comprise a plurality of pixels, calculated from corresponding groups of pixels of the primary image at a plurality of positions of a sampling window.

Each pixel value of each secondary image may be calculated from a corresponding group that comprises a plurality of pixels of the primary image that fall within the sampling window at a respective one of the plurality of sampling window positions. The plurality of positions of a sampling window, for generating a specific secondary image, may comprise a checkerboard pattern, with each sampling window position being separated from its nearest-neighbour sampling window position, in each of the x and y directions. Alternatively, the plurality of positions of a sampling window, for generating a specific secondary image, may be contiguous (i.e. directly adjacent and non-overlapping) with one another. The plurality of positions of a sampling window, for generating a first secondary image, may be different to the plurality of positions of the sampling window, for generating a second, different secondary image of the same source image or a target image. For example, the checkerboard pattern used for generating a first secondary image may be the opposite of the checkerboard pattern used for generating a second secondary image. For example, the plurality of sampling window positions used for generating a second secondary image may be offset, such as diagonally offset, from a plurality of positions used for generating a first secondary image. The same size and shape of sampling window may be used, for generating the pixel values for every pixel of a secondary image. The same size and shape of sampling window may be used, for generating the pixel values for each pixel of both a first secondary image and a second secondary image of the same source image or target image.

The inventors have disclosed herein an approach in which a plurality of a secondary images is derived by sampling a primary image. The primary image may correspond to the source image or an image derived from the source image (herein an "intermediate image"). A hologram is determined and displayed for each secondary image. A corresponding plurality of holographic reconstructions are therefore formed on the replay plane, either concurrently or one after the other. The holographic reconstructions are formed within the integration time of the human eye such that a viewer cannot tell that the projected image that they see is formed either from multiple holographic reconstructions, formed one after the other, and/or from holograms that are displayed on multiple respective display areas or display devices. The projected image therefore appears to be a faithful and complete reconstruction of the source image. Due to the technique of sampling, each secondary image can have lower resolution than the primary image. Provided the primary image has a sufficiently high resolution, a desired resolution of the complete holographic reconstruction of the source image can be achieved.

According to an aspect, a holographic projector is provided, wherein the holographic projector is arranged to project a target image. The holographic projector comprises an image processing engine arranged to generate a plurality of secondary images by sampling a primary image derived from the target image, wherein each secondary image may comprise fewer pixels than the primary image. The holographic projector further comprises a hologram engine arranged to determine a hologram corresponding to each secondary image to form a plurality of holograms, and a display engine arranged to display each hologram on a display device. The holograms may be displayed in turn on the same display device and/or on different respective display devices and/or on different respective zones or areas of a common display device. The holographic projector further comprises a light source arranged to Illuminate each hologram during display to form a holographic reconstruction corresponding to each secondary image on a replay plane. Each secondary image may comprise a plurality of pixels, calculated from corresponding groups of pixels of the primary image at a plurality of positions of a sampling window, wherein each pixel value of secondary image may be calculated from a corresponding group that comprises a plurality of pixels of the primary image that fall within the sampling window at a respective one of the plurality of sampling window positions. At least some of the plurality of positions of the sampling window that are used for generating a first secondary image may be different to at least some of a plurality of positions of the sampling window that are used for generating a second different secondary image.

According to an aspect, a holographic projector is provided, wherein the holographic projector is arranged to project a target image. The holographic projector comprises an image processing engine arranged to generate a plurality of secondary images by sampling a primary image derived from the target image, wherein each secondary image may comprise fewer pixels than the primary image. The holographic projector further comprises a hologram engine arranged to determine a hologram corresponding to each secondary image, to form a plurality of holograms, and a display engine arranged to display each hologram on one or more display devices. The holograms may be displayed in turn on the same display device and/or on different respective display devices and/or on different respective zones or areas of a common display device. The holographic projector further comprises a light source arranged to Illuminate each hologram during display to form a holographic reconstruction corresponding to each secondary image on a replay plane. Each secondary image comprises a plurality of pixels, each of which may be calculated from corresponding groups of pixels of the primary image at a plurality of respective positions of a sampling window.

According to this aspect, the sampling may comprise calculating the pixel value of each pixel of a secondary image by individually weighting the pixel values of a respective group of pixels of the primary image, which fall within the sampling window at a respective one of its plurality of positions, such that there is a positional correspondence between each pixel of said secondary image and the respective group of pixels of the primary image. A first set of sampling window positions may be used for calculating a first secondary image and a second, different set of sampling window positions may be used for calculating a respective second secondary image, within the plurality of secondary images. The first set of sampling window positions may be offset, for example diagonally offset, from the second set of sampling window positions. A first holographic reconstruction may be formed by displaying and illuminating a hologram corresponding to the first secondary image, spatially-displaced on the replay plane relative to a second holographic reconstruction formed by displaying and illuminating a hologram corresponding to the second secondary image, in order to interlace the first and second holographic reconstructions.

According to an aspect, a holographic projector is provided, wherein the holographic projector is arranged to project a target image, the holographic projector comprising an image processing engine arranged to generate a plurality of secondary images by sampling a primary image derived from the target image, wherein each secondary image may comprise fewer pixels than the primary image. The primary image may comprise or may be derived from a source image, which comprises an upscaled version of the target image. The holographic projector may further comprise a hologram engine arranged to determine a hologram corresponding to each secondary image to form a plurality of holograms, and a display engine arranged to display each hologram on a display device. The holograms may be displayed in turn on the same display device and/or on different respective display devices and/or on different respective zones or areas of a common display device. The holographic projector further comprises a light source arranged to Illuminate each hologram during display to form a holographic reconstruction corresponding to each secondary image on a replay plane.

According to this aspect, each secondary image may comprise a plurality of pixels, calculated from corresponding groups of pixels of the primary image at a plurality of positions of a sampling window, wherein the sampling comprises calculating the pixel value of each pixel of a secondary image from a respective group of pixels of the primary image, which fall within the sampling window at a respective one of its plurality of positions, such that there is a positional correspondence between each pixel of said secondary image and the respective group of pixels of the primary image. There may be a first ratio between the resolution of the target image and the resolution of the source image and a second, different ratio between the resolution of each one of the secondary images and the resolution of the source image. In other words; there may be a first ratio between the number of pixels in a hologram corresponding to the target image and the number of pixels in a hologram corresponding to the source image and a second, different ratio between the number of pixels in each respective hologram corresponding to each one of the secondary images and the number of pixels in a hologram corresponding to the source image.

Therefore, a desired or required net ratio, between the resolution of the target image and the resolution of one or more secondary images, may be achieved.

The approaches described herein provide significant technical contributions to the field. Firstly, the quality of the projected image is improved. Secondly, the speed at which the projected image can be updated (i.e., the frame rate) is increased. Thirdly, a more flexible holographic projector is provided. These technical contributions are explained respectively in the following paragraphs.

First, the approach disclosed herein enables pixel crosstalk to be managed by displaying different image pixels at different times or on different respective display devices (or in different respective zones or sections of a common display device). More specifically, different groups of image spots are displayed at different times or on different respective display devices (or in different respective zones or sections of a common display device). For example, a first holographic reconstruction formed at a first time (corresponding to a first secondary image) may comprise a first group of image pixels (e.g., every other image pixel or pixels formed from sampling a primary image at a first plurality of sampling window positions) of an image frame and a second holographic reconstruction at a second time (corresponding to a second secondary image) may fill in the gaps of the image frame by displaying a second group comprising the remaining image pixels (or pixels formed from sampling the primary image at a second, different plurality of sampling window positions. Since image pixels of the first and second groups (e.g. adjacent pixel groups) are not displayed at the same time, interpixel interference and pixel crosstalk is reduced. The inventors have therefore disclosed a technique of interlacing (in time and/or in space) a plurality of holographic reconstructions to improve image quality by managing pixel crosstalk.

In the present disclosure, the new approaches are implemented by sampling a high-resolution source image in a plurality of different ways to obtain a respective plurality of secondary images. Thus, it is possible to achieve a desired resolution of the interlaced holographic reconstructions by "upscaling" the target image to form a source image, and sampling the source image or an intermediate image based on the source image, whilst managing pixel crosstalk.

Secondly, the inventors have disclosed herein approaches which are suitable for real-time (i.e. video rate) processing. Specifically, the holograms can be determined and displayed within the frame time of video. This technical contribution is achieved because each secondary image may have fewer pixels than the source image. Although more holograms are required for reconstructing each source image, when the secondary images have fewer pixels than the source image, each individual hologram can be determined much more quickly. For example, it is quicker to calculate two holograms comprising x pixels using a Fourier transform method than it is to calculate one hologram comprising 2x pixels. The inventors have therefore disclosed a technique to increase the speed of calculating holograms corresponding to a source image to enable holographic projection at acceptable video frame rates.

These and other advantages of the new approach disclosed herein will be further appreciated from the following detailed description.

The term "target image" is used herein to reference to the input to the holographic system described herein. That is, the target image is the image that the holographic system is required to project onto a holographic replay plane. The target image may be one image of a sequence of images such as a video-rate sequence of images.

The term "source image" is used herein to refer to an image derived from the target image. The source image may be the same as the target image or the source image may be an upscaled version of the target image. That is, the source image may comprise more pixels than the target image. Any upscaling technique may be employed. In some embodiments, upscaling comprises repeating pixel values of the target image, as described in the detailed description. In these embodiments, the computational engine may use a simple mapping scheme to represent the repeating.

The term "warping" is used herein to refer to the process by which an image is distorted by the optics of an optical system, such as an optical relay system, used to image the holographic reconstruction. The optical system may include elements having non-uniform optical power. A "warping map" is a mathematical function or mapping scheme which describes/defines how an image will be changed (e.g. distorted) by the optical system. Specifically, warping maps describe how discrete points (e.g. pixels or pixel areas) of an image will be changed (e.g. displaced/translated) by the optical system. The holographic system disclosed herein may anticipate/model/predict the warping that will occur using the warping maps. Some techniques disclosed herein require a warping map (or pair of warping maps—e.g. x- and y-warping maps) but the process by which the warping map/s are determined/calculated is not relevant to the inventions disclosed herein—but examples are briefly outlined to help the reader. In examples in which the optical system images each holographic reconstruction and each image is visible within an eye-box region, a warping map pair may be defined for a plurality of eye-box positions.

The term "primary image" is used herein to refer to either (1) the source image or (2) an intermediate image derived from the source image. In the description of embodiments, the term "intermediate image" is used herein to refer to an image derived from the source image in accordance with a warping map. Specifically, the term "intermediate image" is used herein to refer to a warped version of the source image—that is, the source image after warping using a warping map or pair of warping maps, wherein the warping map/s characterise the distortion caused by a corresponding optical system.

The term "secondary image" is used herein to refer to one of a plurality of images derived from the primary image. Each secondary image is formed by sub-sampling (also referred to as "sampling" and which may be referred to as "under-sampling") the primary image. Each secondary image may comprise fewer pixels than the source image. Each pixel value of the secondary image may be calculated from several pixel values of the primary image, optionally, using a weighting technique as described in the detailed description. Notably, the upscaling process used to form the source image from the target image is different to the sub-sampling technique used to form each secondary image from the primary image. The secondary images are each different to the primary image but, optionally, they may have the same number of pixels or more pixels than the primary image. If the secondary images have fewer pixels than the source image, the pixels of the secondary images can comprise contributions from each of the pixels of the source image. A hologram corresponding to each secondary image is calculated.

The term "hologram" is used to refer to the recording which contains amplitude information or phase information, or some combination thereof, about the object. The term "holographic reconstruction" is used to refer to the optical reconstruction of the object which is formed by illuminating the hologram. The term "replay plane" is used herein to refer to the plane in space where the holographic reconstruction is fully formed. The term "replay field" is used herein to refer to the sub-area of the replay plane which can receive spatially-modulated light from the spatial light modulator. The terms "image", "replay image" and "image region" refer to areas of the replay field illuminated by light forming the holographic reconstruction. In embodiments, the "image" may comprise discrete spots which may be referred to as "image pixels".

The terms "encoding", "writing" or "addressing" are used to describe the process of providing the plurality of pixels of the SLM with a respect plurality of control values which respectively determine the modulation level of each pixel. It may be said that the pixels of the SLM are configured to "display" a light modulation distribution in response to receiving the plurality of control values. Thus, the SLM may be said to "display" a hologram.

It has been found that a holographic reconstruction of acceptable quality can be formed from a "hologram" containing only phase information related to the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will change the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

Although different examples and embodiments may be disclosed separately in the detailed description which follows, any feature of any example or embodiment may be combined with any other feature or combination of features of any example or embodiment. That is, all possible combinations and permutations of features disclosed in the present disclosure are envisaged.

BRIEF DESCRIPTION OF THE DRAWINGS

Specific embodiments are described by way of example only with reference to the following figures:

FIG. 6 shows an example source image;

FIG. 7A shows an example technique for sampling the source image of FIG. 6 to derive a first secondary image in accordance with embodiments;

FIG. 17A shows a checkerboarding approach to sub-sampling the upscaled target image;

FIG. 18 shows a sampling window for sub-sampling in accordance with some embodiments;

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
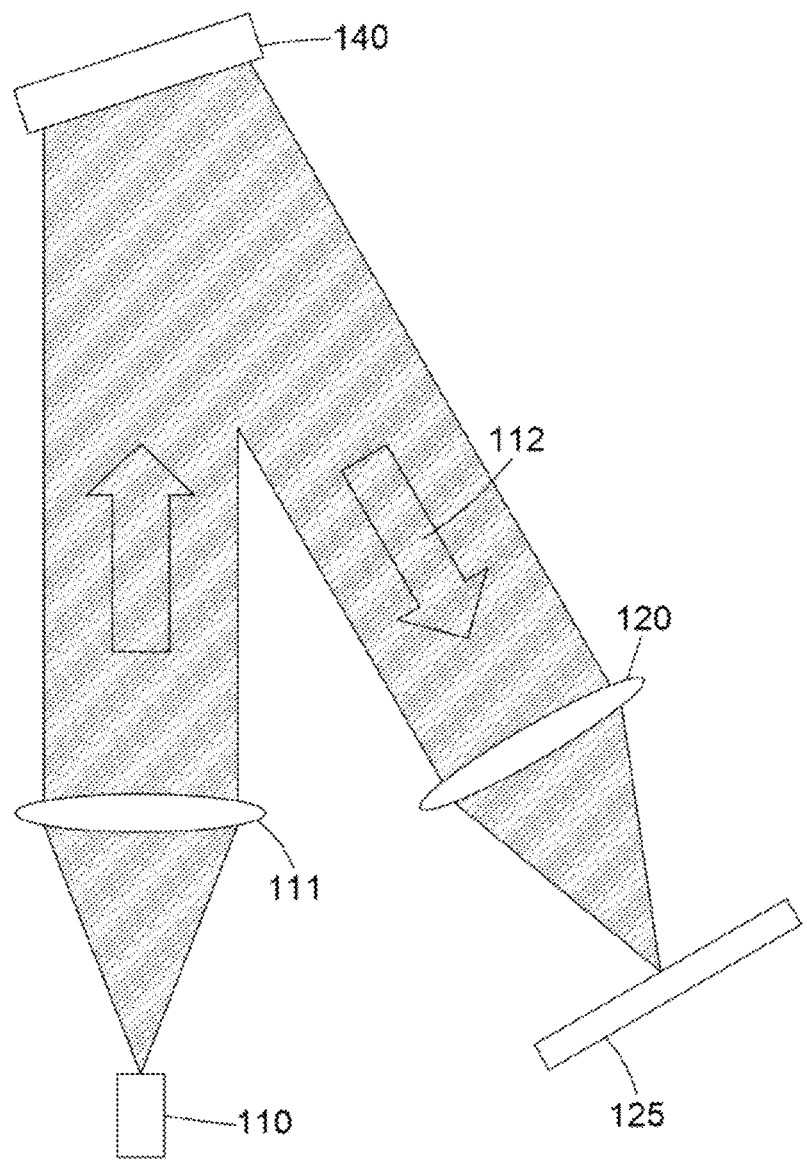
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer).

However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
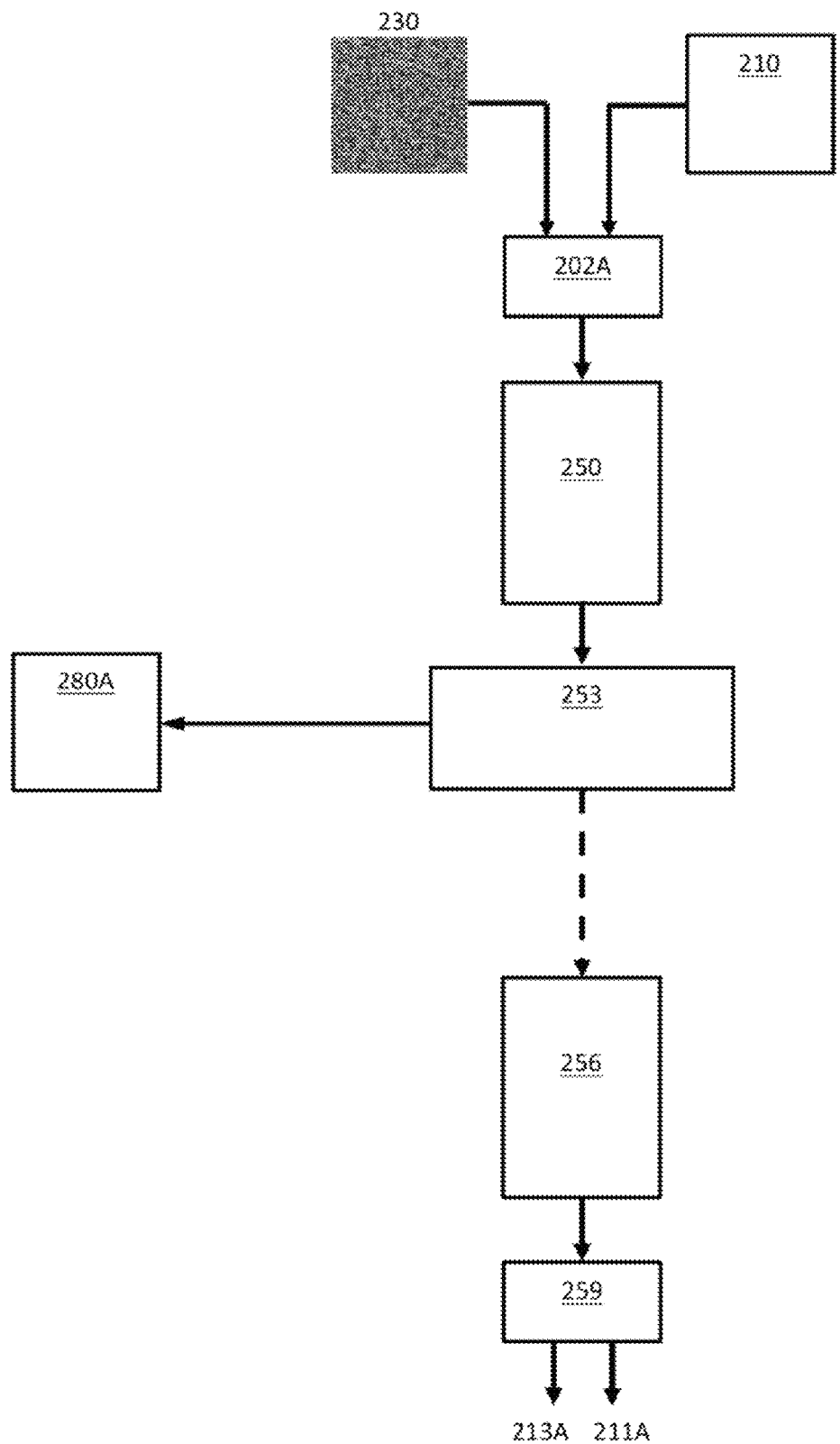
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantiles each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
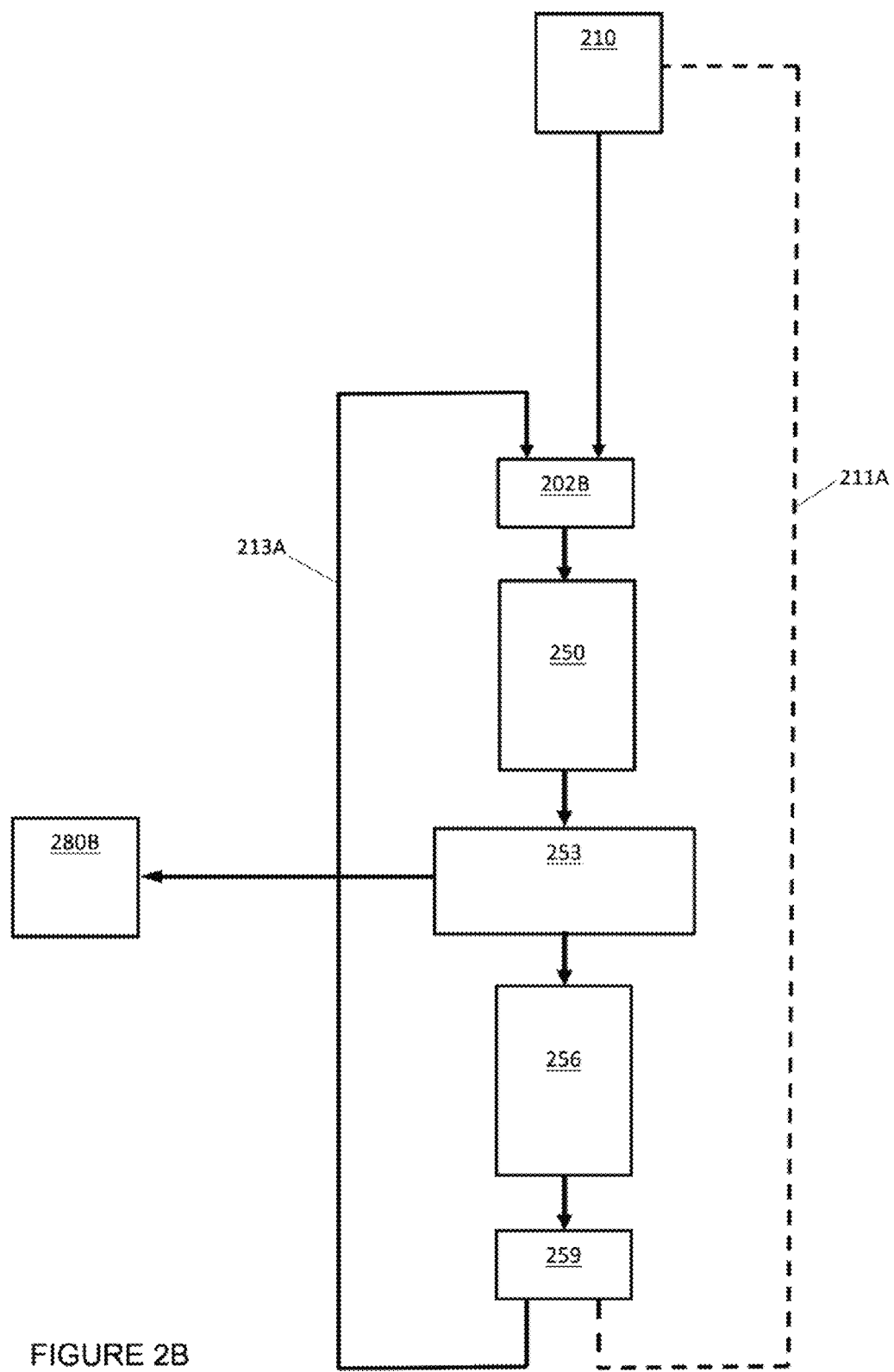
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
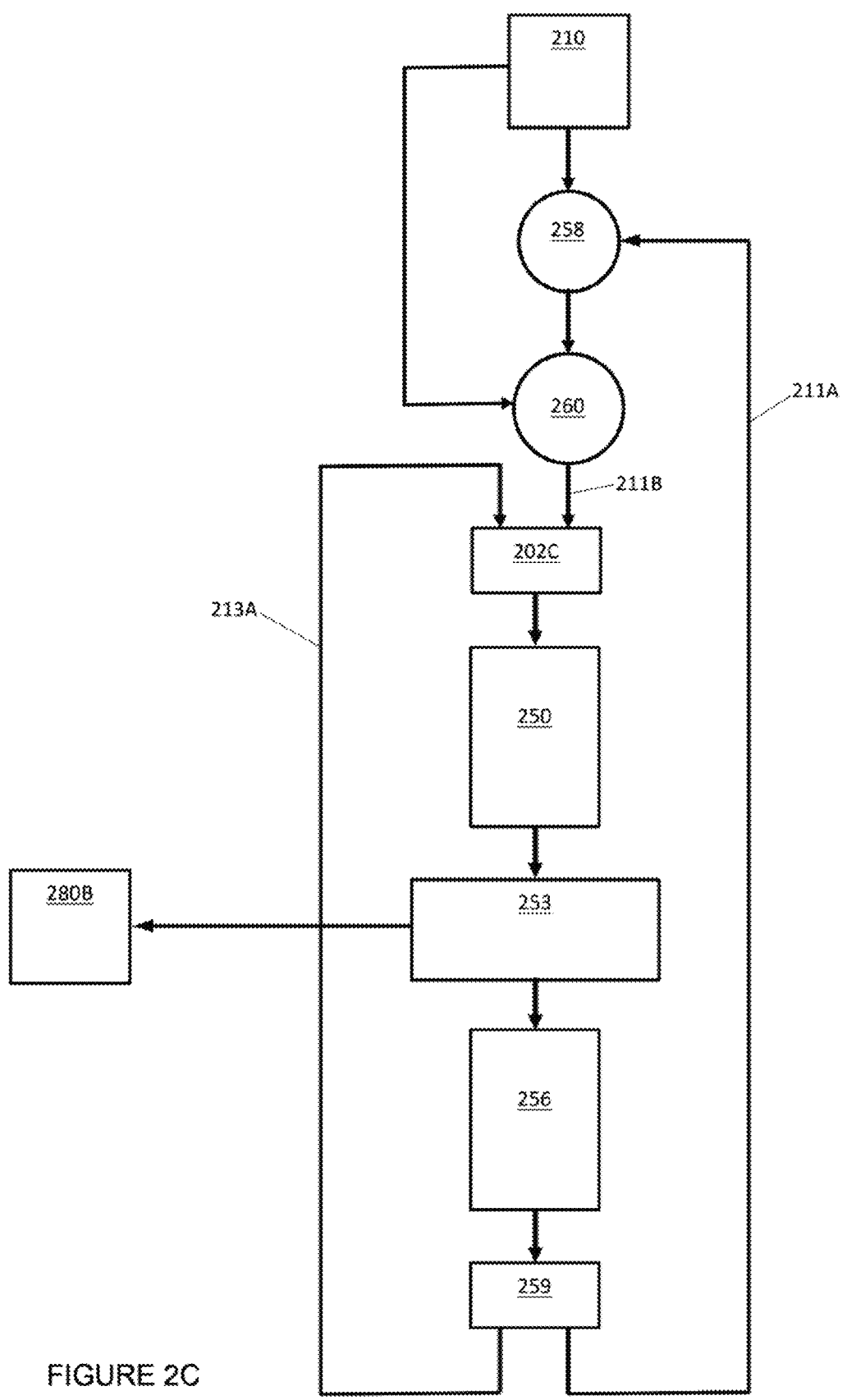
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y] = F'\{\exp(i\psi_n[u,v])\}$$

$$\psi_n[u,v] = \angle F\{\eta \cdot \exp(i \angle R_n[x,y])\}$$

$$\eta = T[x,y] - \alpha(|R_n[x,y]| - T[x,y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed computationally by including lensing data in the holographic data. That is, the hologram includes data representative of a lens as well as data representing the object. In these embodiments, the physical Fourier transform lens 120 of FIG. 1 is omitted. It is known in the field of computer-generated hologram how to calculate holographic data representative of a lens. The holographic data representative of a lens may be referred to as a software lens. For example, a phase-only holographic lens may be formed by calculating the phase delay caused by each point of the lens owing to its refractive index and spatially-variant optical path length. For example, the optical path length at the centre of a convex lens is greater than the optical path length at the edges of the lens. An amplitude-only holographic lens may be formed by a Fresnel zone plate. It is also known in the art of computer-generated hologram how to combine holographic data representative of a lens with holographic data representative of the object so that a Fourier transform can be performed without the need for a physical Fourier lens. In some embodiments, lensing data is combined with the holographic data by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may include grating data—that is, data arranged to perform the function of a grating such as beam steering. Again, it is known in the field of computer-generated holography how to calculate such holographic data and combine it with holographic data representative of the object. For example, a phase-only holographic grating may be formed by modelling the phase delay caused by each point on the surface of a blazed grating. An amplitude-only holographic grating may be simply superimposed on an amplitude-only hologram representative of an object to provide angular steering of an amplitude-only hologram.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and holograms calculated by other techniques such as those based on point cloud methods.

Light Modulation

A spatial light modulator may be used to display the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimeters in width). The pixels are typically approximately microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
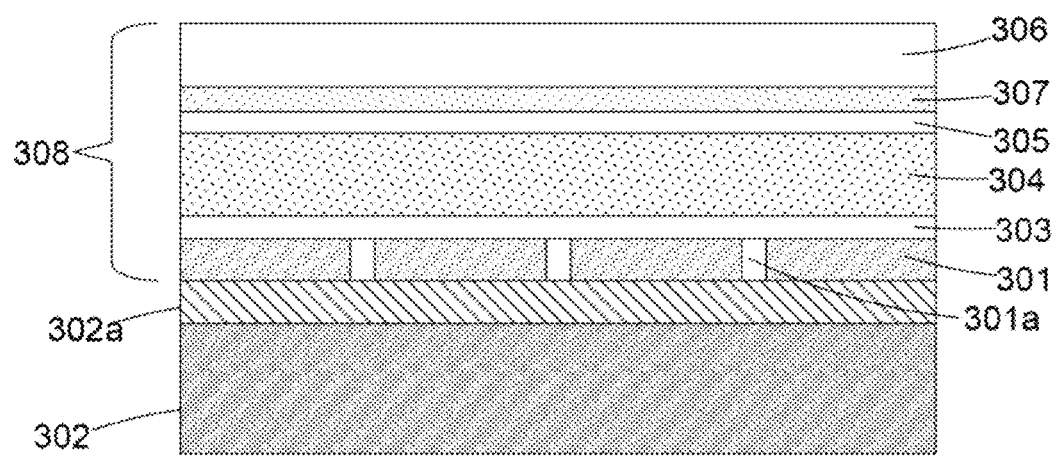
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Generating Multiple Holograms from a Source Image

The following embodiments concern specific techniques which may include: (1) calculating a source image from a target image; (2) determining a primary image from the source image; (3) determining a plurality of secondary images from the primary image; and (4) calculating a hologram corresponding to each secondary image. In accordance with these techniques, a plurality of holograms corresponding to the target image are calculated. In some embodiments (e.g. the target image is sufficiently high resolution), the source image is the same as the target image. In some embodiments (e.g. warping is ignored), the primary image is the same as the source image. Step 1 may include upscaling. Step 3 includes sampling or sub-sampling. The upscaling and sub-sampling processes are different—that is, they are not the simple inverse or reverse of each other. Therefore, a desired ratio between the resolution of the target image and the resolution of a secondary image may be obtained.

In accordance with conventional techniques, a single hologram corresponding to a target image is calculated. The hologram is sent to the display engine of a spatial light modulator in a data frame which may be a HDMI frame. The size of the hologram determined for the image (i.e. number of hologram pixels) may be less than the size of the spatial light modulator (i.e. number of SLM pixels). Thus, when displayed, the hologram may occupy only a part of the surface area of the SLM (i.e. only some of the SLM pixels). In this case, a tiling engine may be implemented for writing the hologram to the pixels of the SLM according to a tiling scheme in order to use more of the SLM pixels.

In some embodiments, a target image for projection is "upscaled" to form a source image having an increased number of pixels. Thus, the resolution (in terms of the number of pixels) is increased. The upscaling of an image may increase the number of pixels by a power of two, since the number of pixels is multiplied in both the x- and y-directions. For example, an image may be upscaled by 4 in the x- and y-directions. For example, each individual pixel may be replicated in a 4×4 array of pixels (i.e. with the same pixel value) in the upscaled image. In consequence, an image comprising an n×m array of pixels is "upscaled" or "over-sampled" to obtain a 4n×4m array of pixels forming an oversampled or upscaled version of the image. The over-sampled/upscaled image may be used as the source image as described below. More complex methods of upscaling the target image may be used.

Sub-Sampling Using Checkerboarding

Figure 4:
FIG. 4 shows an example technique for determining a pair of holograms from respective secondary images derived from a source image for projection by a holographic projector in accordance with embodiments.
Figure 4:
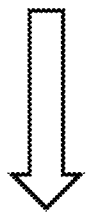
Figure 4:
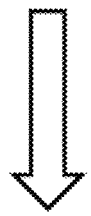
Figure 4:
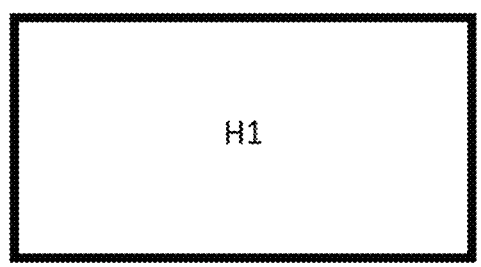
Figure 4:
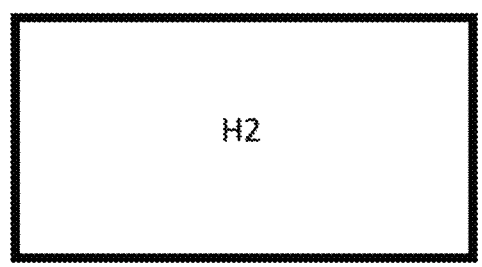

FIG. 4 shows an example technique for determining a pair of holograms H1 and H2 from respective secondary images 1 and 2 derived from a primary image in accordance with embodiments. In the embodiments described in this section of the disclosure, the primary image is the source image. The following description refers to the source image (rather than the primary image) for simplicity.

Referring to FIG. 4, an example source image (shown at the top of the drawing) comprising an 4×8 array of image pixels is processed (e.g. by an image processing engine) to generate a pair of secondary images 1 and 2 (shown in the middle of the drawing) based on a "checkerboard" layout or pattern. Secondary image 1 is generated using every other image pixel of the source image in a first checkerboard pattern, and filling the remaining pixels with a "zero". Thus, secondary image 1 includes the image pixels from the source image at locations (1, 1), (1, 3) . . . (2, 2), (2, 4) . . . (3, 1), (3, 3) . . . and (4, 2) . . . (4, 8). Secondary image 2 is generated using the opposite or inverse image pixels of the source image to secondary image 1. Thus, secondary image 2 is generated using every other image pixel of the source image in a second checkerboard pattern that is opposite to (i.e. the inverse of) the first checkerboard pattern, and filling the remaining pixels with a "zero". Thus, secondary image 2 includes the image pixels from the source image at locations (1, 2), (1, 4) . . . (2, 1), (2, 3) . . . (3, 2), (3, 4) . . . and (4, 1) . . . (4, 7). Each of secondary images 1 and 2 is then processed (e.g. by a hologram engine) to determine a corresponding hologram H1, H2 (shown at the bottom of the drawing). Any suitable method may be used to calculate the hologram, such as the algorithms described above.

Figure 5:
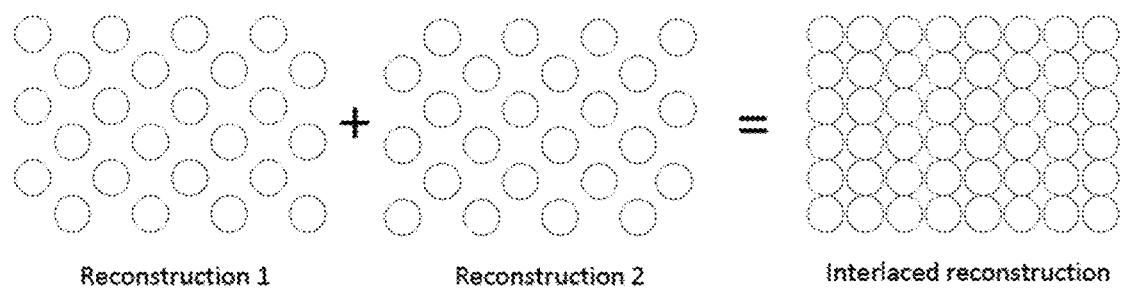
FIG. 5 shows holographic reconstructions produced by sequentially displaying a pair of holograms, based on a generalisation of the example technique of FIG. 4, in accordance with embodiments.

FIG. 5 shows holographic reconstructions produced by sequentially displaying holograms H1 and H2 based on a generalisation of the example technique shown in FIG. 4, in accordance with embodiments.

In particular, FIG. 5 shows a subset of image spots formed by a first holographic reconstruction of a first hologram H1 corresponding to secondary image 1 (shown on the left-hand side of the drawing), in a first checkerboard pattern. FIG. 5 shows a subset of image spots formed by a second holographic reconstruction of a second hologram H2 corresponding to secondary image 2 (shown in the middle of the drawing), in a second checkerboard pattern, which is the opposite or inverse of the first checkerboard pattern. Secondary image 1 is derived by sampling the pixels (or groups/clusters of pixels) of a source image with the first checkerboard pattern (e.g. sampling odd-numbered pixels in odd-numbered rows and even-numbered pixels in even-numbered rows), and zeroing out the other (un-sampled) pixels. Secondary image 2 is derived by sampling the pixels (or groups/clusters of pixels) of the source image with the second checkerboard pattern (e.g. sampling even-numbered pixels in odd-numbered rows and odd-numbered pixels in even-numbered rows), and zeroing out the other (un-sampled) pixels. FIG. 5 further shows the combined holographic reconstruction appearing to the viewer by forming the first and second holographic reconstructions, in turn, within the integration time of the human eye (shown on the right-hand side of the drawing).

By using the checkerboarding approach, the spacing between the image spots (or "image pixels") of each individual holographic reconstruction shown in FIG. 5, is increased by a factor or two by reducing the number of hologram pixels in H1 and H2. It can be said that the spatial resolution of each holographic reconstruction (density of image spots in the replay field) is reduced by a factor of two. The two holographic reconstructions can be interlaced together, in time, by using (e.g. adding) a phase-ramp or software grating function (as described above) to translate one of the holographic reconstructions relative to the other such that the image spots of one reconstruction fill the gaps between image spots of the other reconstruction. This is advantageous because it helps prevents any overlap between adjacent image spots (i.e. it reduces or prevents "pixel crosstalk"). As described above, the overlapping of adjacent image spots or image pixels can produce interference which appears as grain/noise to the viewer. By time interlacing the display of the first and second holograms H1 and H2—forming the first and second holographic reconstructions in turn rather than at the same time—this interference can be minimised.

In embodiments, each of the holograms H1 and H2 may be sequentially written to, and thus displayed on, the SLM at a speed that is sufficiently fast that the corresponding holographic reconstructions are formed within the integration time of the human eye. Thus, a viewer, observing the replay field on which the holographic reconstructions are formed, sees a single projected image rather than a dynamically changing projected image corresponding to multiple holographic reconstructions formed one after the other. The projected image therefore appears to be a faithful and complete reconstruction of the source image.

Alternatively, the holograms H1 and H2 may be written to, and thus displayed on, two different respective SLMs, at substantially the same time, in an arrangement that enables the corresponding holographic reconstructions to be formed in a common area of the holographic replay plane, for example by providing different respective optical paths from each SLM, towards the holographic replay plane. Thus, a viewer, observing the replay field on which the holographic reconstructions are formed, sees a single projected image rather than two separate projected images corresponding to multiple holographic reconstructions formed from different respective SLMs. The projected image therefore appears to be a faithful and complete reconstruction of the source image.

As the skilled person will appreciate, whilst FIGS. 4 and 5 show generating two secondary images from the source image, it is possible to generate three or more secondary images and calculate corresponding holograms. This can be achieved using "checkerboarding" by increasing the spacing (number of un-sampled pixels) between the sampled image pixels (or groups/clusters of pixels) of the source image, thereby increasing the number of checkerboard patterns. For example, three checkerboard patterns may be used (each checkerboard pattern sampling every third pixel in each row) to generate three secondary images from the source image, and so on.

The checkerboarding approach described above can be used together with any suitable technique for generating a plurality of secondary images from a primary image. Examples of such techniques are provided below.

Sub-Sampling with Kernels

FIGS. 6 to 9 illustrate a technique for generating secondary images using so-called "kernels". In particular, a kernel is used to directly sample (or "sub-sample") pixels of a high-resolution image to derive a plurality of secondary images. In the embodiments described in this section of the disclosure, each secondary image comprises fewer pixels than the source image. However, other embodiments are contemplated, in which sampling is used to produce secondary images that have the same number of pixels as the source image, or even more pixels than the source image. In the embodiments described in this section of the disclosure, the primary image is also the same as the source image. The following description refers to the source image (rather than the primary image) for simplicity.

Figure 6:
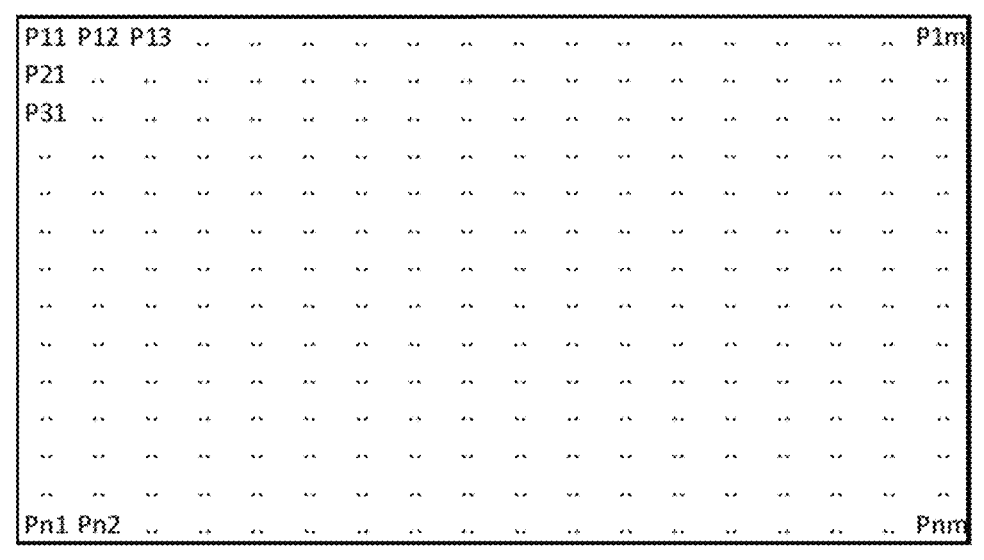

FIG. 6 shows an example of a high-resolution source image, which may be an upscaled "target image" for projection by a holographic projector, as described below with reference to FIGS. 16A and 16B. In particular, source image 600 comprises an n×m array of pixels P comprising n rows and m columns. The number of pixels in the array has a higher resolution than the desired resolution of the image (holographic reconstruction) projected by the holographic projector. For example, the source image may have a minimum of 2× the desired resolution, such as 4× or 8× the desired resolution. In this way, when sampling (sub-sampling) is performed, as described below, the holographic reproduction of the source image has the desired resolution even though the resolution is reduced compared to the high-resolution source image. Thus, it may be said that the target image is "over-sampled" or "upscaled" to produce the source image, and that source image is then "sampled" or "sub-sampled" to achieve the desired net resolution of the image (holographic reconstruction). In accordance with FIGS. 6 to 9, sampling is performed using kernels.

Figure 7B:
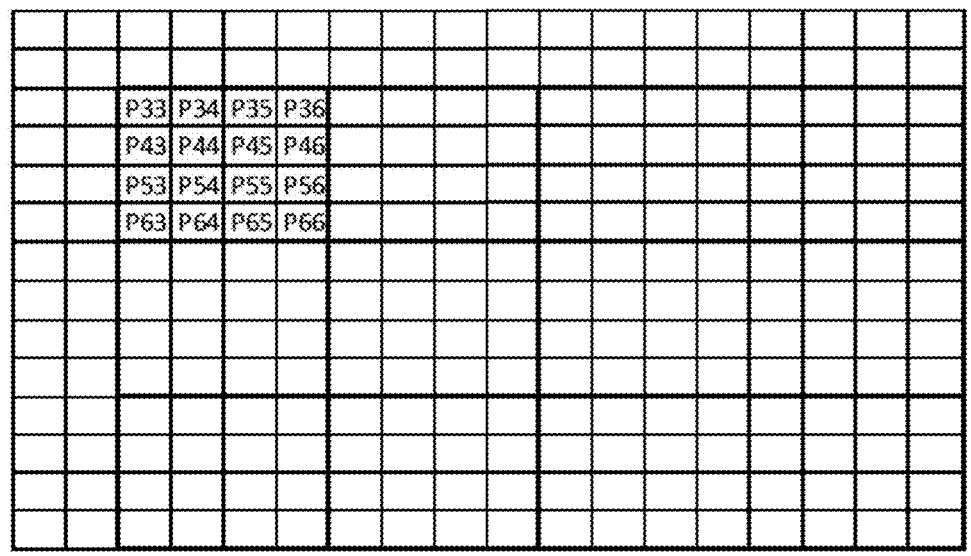
FIG. 7B shows an example technique for sampling the source image of FIG. 6 to derive a second secondary image that is diagonally offset to the first secondary image in accordance with embodiments.
Figure 7B:
Figure 7B:
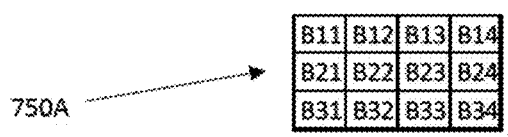

FIG. 7A shows an example technique for sampling the source image of FIG. 6 to derive a first secondary image and FIG. 7B shows an example technique for sampling the source image of FIG. 6 to derive a second secondary image, that is diagonally offset to the first secondary image.

Figure 8:
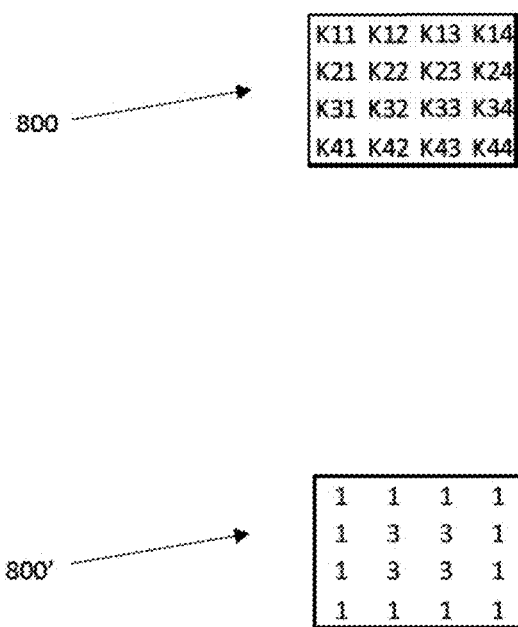
FIG. 8 shows example kernels for use in the sampling techniques of FIGS. 7A and 7B.

Referring to FIG. 7A, the source image 700 is sampled using a so-called "kernel" to derive a first secondary image 750A. A kernel may be considered as a moving sampling window. FIG. 8 show a generic kernel 800 and an example, specific kernel 800'. In the illustrated examples, the kernel comprises a sampling window for a 4×4 array of pixels (group of pixels). According to the presently-disclosed methods, the kernel acts as a sampling window for generating one or more secondary images, from the pixels of the source image. For each secondary image that is to be generated, the kernel is incrementally moved to a series of sampling window positions that overlay contiguous (i.e. adjacent and non-overlapping) 4×4 arrays/groups of pixels of the source image. It may be said that the kernel operates on contiguous 4×4 arrays of pixels of the source image. For each contiguous sampling window position, the kernel operates to determine a single sub-sampled pixel value A for the secondary image 750A that is representative of the 16 pixels values P of the source image that are within the 4×4 sampling window, at its current position. There is a correspondence between the sampling window position, within the source image, which gives rise to a particular pixel value, and the position of the pixel to which that pixel value is assigned, within the secondary image.

By way of non-limiting example, FIG. 7A (top of drawing) shows the pixels $P_{11}$ to $P_{44}$ of the source image sampled by the kernel at a first sampling window position 710A, covering a 4×4 array of pixels starting at pixel $P_{11}$ (top left of source image). The 16 pixels in that array, at that first sampling window position, are used to derive the pixel value $A_{11}$ in the upper left corner of the sub-sampled image (secondary image, bottom of drawing). In this example, there are 12 contiguous sampling window positions on the source image.

The kernel may determine the pixel value A, for a pixel of the secondary image, at a sampling window position based on the pixel values P of each of the 16 pixels in the 4×4 pixel array of the source image weighted according to a kernel weight K for the respective pixel, as described below. Thus, the kernel operates at each sampling window position so as to determine a plurality of corresponding pixel values and thereby derive a sampled (e.g. sub-sampled) secondary image 750A. In FIG. 7A, the sampled image 750A comprises 12 pixels arranged in a 3×4 array of pixels A, where each pixel value A corresponds to one of the 12 contiguous sampling window positions on the source image.

FIG. 8 shows an example kernel 800' comprising a sampling window for a 4×4 pixel array, which may be used in FIG. 7A.

Kernel 800 is a generic kernel for a 4×4 pixel array sampling window size (i.e. 4×4 pixel array kernel size). Kernel 800 comprises a 4×4 array of kernel pixels, each kernel pixel defining a weight K for a pixel value P of a corresponding pixel of the 4×4 pixels of the source image in the sampling window. At each sampling window position, the sub-sampled pixel value A (for the secondary image) may be determined as an average of the kernel-weighted pixel values P (from the source image). Thus, kernel 800 defines kernel weights $K_{11}$ to $K_{44}$ corresponding to pixel values $P_{11}$ to $P_{44}$ of the source image at the first sampling window position, and pixel value $A_{11}$ of the under-sampled image is determined as $\frac{1}{16} \times ((K_{11} \times P_{11}) + (K_{22} \times P_{22}) + \ldots (K_{44} \times P_{44}))$.

Kernel 800' shows an example of the generic kernel 800, which defines kernel weights K for pixel kernels in an example embodiment. In particular, the weight of kernel pixels in the centre of the kernel is "3", whilst the weight of kernel pixels at the periphery of the kernel is "1". Thus, pixels values P of inner sampled pixels of the source image (i.e. pixels at the centre of the sampling window) have higher weight than pixel values P of outer samples pixels of the source image. As the skilled person will appreciate, many variations of the values of kernel weights are possible according to application requirements. In addition, any kernel shape and size (arrangement, aspect ratio and number of kernel pixels) corresponding to sampling window may be chosen according to application requirements. For example, the kernel weights can be selected to achieve the optimal antialiasing results.

Referring to FIG. 7B, the source image 700 is sampled, using the same kernel as the sampling in FIG. 7A described above, to derive a second secondary image 750B. Thus, contiguous 4×4 pixel arrays of the source image 700 are under-sampled at contiguous sampling window positions. However, the sampling window positions used to derive the second secondary image 750B are diagonally offset from, but partially overlap, the sampling window positions used in FIG. 7A to derive the first secondary image 750A. In particular, in FIG. 7B, the first sampling window position 710B is diagonally offset by 2×2 pixel positions (i.e. two pixels in each direction), so that it overlaps the lower right quadrant of 2×2 pixel positions of the first sampling window position 710A of FIG. 7A. Thus, FIG. 7B (top of drawing) shows the pixels $P_{33}$ to $P_{66}$ of the source image sampled by the kernel at a first sampling window position 710B starting at pixel $P_{33}$ (top left of source image offset by 2×2 pixels), to derive the pixel value $B_{11}$ of the sub-sampled image (secondary image) comprising pixels $B_{11}$ to $B_{34}$ (bottom of drawing).

Thus, a plurality of secondary images corresponding to a source image is generated by sampling the source image using a sampling scheme (kernel comprising a 4×4 array kernel pixels). Each secondary image may comprise fewer pixels than the source image. Each pixel of each secondary image may comprise a contribution from (e.g. may comprise a weighted average of the pixel values of) a plurality of pixels, within the source image. Furthermore, in the example shown in FIGS. 7A and 7B, each secondary image has the same number of pixels (3×4 pixel array) as each of the respective other secondary images. A hologram is determined for each of the plurality of secondary images, and each hologram is displayed on a display device to form a holographic reconstruction corresponding to each secondary image on a replay plane. The holograms may be displayed in turn by a common device (i.e. by the same device), or they may be displayed substantially simultaneously by two different respective display devices or on two respectively different zones or areas of the same display device.

As described above, when the holograms are displayed in turn, each of the plurality of holograms is displayed, in turn, on the display device within the integration time of the human eye, so that the holographic reconstructions thereof on the replay plane are "interlaced" and appear as a faithful and complete reconstruction of the source/target image.

In order to increase the resolution of the perceived holographic reconstruction on the replay field, the holographic reconstruction of the second hologram is spatially displaced on the replay plane relative to the holographic reconstruction of the first hologram. In particular, the spatial displacement between the holographic reconstructions formed by displaying the first and second holograms comprises a diagonal offset, so that the image spots of the second holographic reconstruction fill in the gaps between the image spots of the first holographic reconstruction. This technique is referred to herein as "diagonal interlacing". In some embodiments, this is achieved by adding a phase-ramp (also referred to above as a grating function) to at least one of the holograms in order to spatially displace the corresponding replay field on the replay plane.

Figure 9:
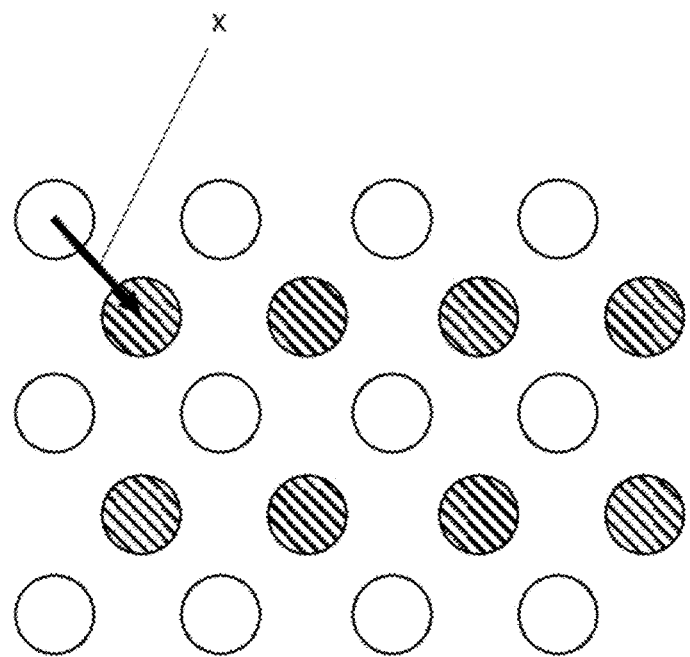
FIG. 9 shows diagonally offset first and second time interlaced holographic reconstructions formed by display of first and second holograms determined for the respective first and second secondary images of FIGS. 7A and 7B in accordance with embodiments.

FIG. 9 shows the combined/integrated holographic reconstruction on the replay plane, as seen by a viewer, formed by displaying the first and second holograms, in turn, using diagonal interlacing. In particular, FIG. 9 comprises image spots of a first holographic reconstruction formed by displaying the first hologram derived from the first secondary image, shown as empty circles, and image spots of a second holographic reconstruction formed by displaying the second hologram derived from the second secondary image, shown as hatched circles. The image spots of the second holographic reconstruction are spatially displaced on the replay plane relative to the image spots of the first holographic reconstruction, by a diagonal offset represented by arrow X. It may be said that the first and second holographic reconstructions are diagonally offset with respect to each other. In particular, the second holographic reconstruction is spatially displaced relative to the first holographic reconstruction in a diagonal direction (e.g. 45 degrees) and by distance such that the image spots of the second holographic reconstruction fill in the gaps between the image spots of the first holographic reconstruction. For example, as illustrated in FIG. 9, each image spot of the second holographic reconstruction is positioned centrally between up to 4 image spots of the first holographic reconstruction. Thus, the combined/integrated holographic reconstruction on the replay plane has an increased pixel density (number of image spots in the replay field).

As the skilled person will appreciate, the diagonal displacement of the first and second holographic reconstructions may be achieved by controlling the display device to change the position of the replay field. This may be achieve using known techniques for changing the position of the replay field on the replay plane (e.g. using x and y phase-ramps), sometimes referred to as "beam steering". The amount of the displacement in each direction is chosen to correspond with the displacement between the first and second secondary images.

Accordingly, a simple technique is provided for "diagonal interlacing" of a plurality of holographic reconstructions corresponding to a source image, wherein each holographic reconstruction has a checkboard pattern of image spots. Each holographic reconstruction has fewer image spots, and thus a lower image spot density/resolution, than a single holographic reconstruction corresponding to the source image, and is displayed at a different time and/or by a different display device or by a different zone or area within a common display device. This reduces the problem of interpixel interference and pixel crosstalk. Furthermore, since the image spots of the respective holographic reconstructions are diagonally displaced, by moving the replay field on the replay plane, so that the image spots of one holographic reconstructions fills the gaps in the checkerboard pattern between the image spots of another holographic reconstruction, the combined/integrated holographic reconstruction has a higher density of image spots, and thus a higher resolution than either/any of the individual holographic reconstructions.

Sub-Sampling an Intermediate Image with Warping Correction

FIGS. 10 to 15 illustrate an alternative technique for generating secondary images. This technique samples (or "sub-samples") pixels of a primary image derived from a high-resolution source image that compensates for so-called "warping". The sampling process derives a plurality of secondary images, so that each may secondary image comprise fewer pixels than the primary image. For the avoidance of doubt, in the embodiments described in this section of the disclosure, the primary image is not the same as the source image. The primary image is an intermediate image derived from the source image in accordance with a warping map or pair of warping maps (e.g. x and y).

Figure 10A:
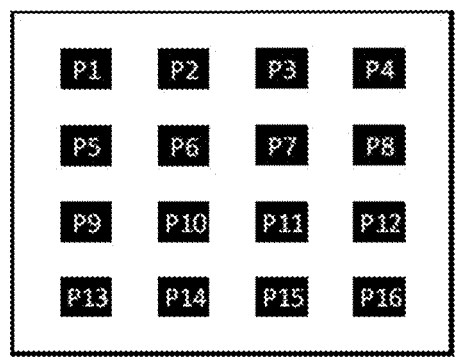
FIG. 10A shows an example source image.

FIG. 10A shows an example source image comprising 16 pixels. The source image may be an upscaled version of the target image for projection, as described below with reference to FIGS. 16A and 16B. In some systems—such as head-up display—an image (e.g. virtual image) of the holographic reconstruction is formed. In the example of head-up display, an image of the holographic reconstruction may be viewed from a so-called eye-box which is a region in space within which the image may be seen. The image of the replay field may be formed by an optical system, such as an optical relay system, which may include optics having optical power and/or an image combiner. The image formed by the optical system may be distorted. The distortion may be modelled by considering the individual displacement (x and y) of each pixel. In practical applications such as a head-up display, such distortions may be caused by magnifying optics, freeform optics, windscreens and the like in the optical path from the replay plane to the eye-box. This effect is known as "warping".

Conventionally, image pre-processing is used to compensate for the effects of warping. In particular, the source image is pre-distorted—using e.g. an anti-warping map—to compensate for the known/measured warping effect. Thus, a pre-processed version of the source image is projected, wherein the pre-processed image or "anti-warped image"

effectively includes distortions (e.g. displaced pixels) having the inverse effect to the warping effect.

Figure 10B:
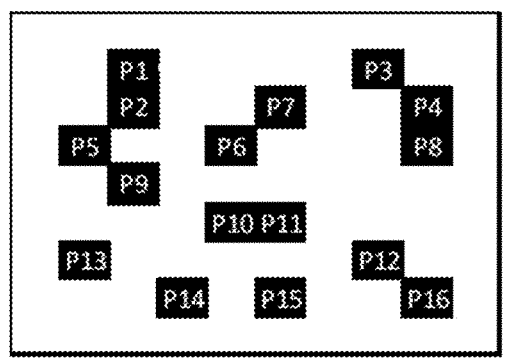
FIG. 10B shows an example warped image, referred to as an intermediate image.

FIG. 10B shows an example of an intermediate image in accordance with the present disclosure, wherein the intermediate image is formed by warping the source image. As shown in FIG. 10B, the position of each of the 16 image pixels is translated in the x-y plane, as compared to their respective positions in the source image in FIG. 10A. The positions of the pixels in the intermediate image may be determined by establishing the translation in the x- and y-directions caused by warping. This can be determined by computational ray tracing from the eye-box back to the replay plane, or by using a camera to measure real-world displacements at the eye-box and interpolating the results (as described in more detail below in relation to the warping maps).

In the embodiments described in this section of the disclosure, the warped image (i.e. an intermediate image not the source or target image) as illustrated in FIG. 10B is sampled (e.g. sub-sampled) to generate a plurality of secondary images. As in the prior technique, the sampling process for generating first and second secondary images includes a diagonal offset with a partial overlap, as described below. The secondary images used for calculating the holograms effectively compensate for the warping effect that an optical system would otherwise have on the source image, because the secondary images are calculated from the intermediate image (i.e. the warped image) not the source image. Accordingly, as well as the advantages of "diagonal interlacing" as described above, this technique has the additional advantage of simultaneously compensating for warping caused by an optical relay system arranged to image the holographic reconstructions on the replay plane.

Figures 11A, 11B:
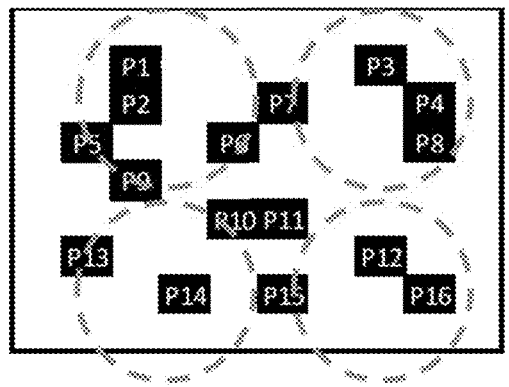
FIG. 11A shows sampling of the intermediate image of FIG. 10B to determine a first secondary image and FIG. 11B shows the first secondary image, in accordance with embodiments.
Figure 12:
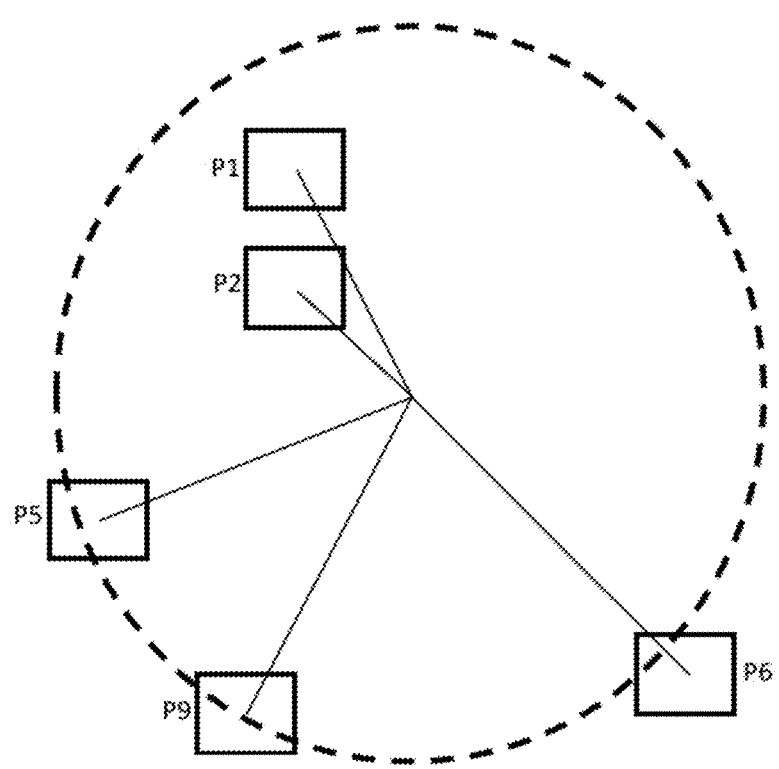
FIG. 12 shows a magnified view of a part of FIG. 11A.

Referring to FIG. 11A, the warped image of FIG. 10B is sampled using a group of four symmetrically arranged circular sampling windows, which, in the illustrated arrangement, overlay the entire warped image to determine the pixel values of a first secondary image. In this example, each secondary image has only 2×2 pixels but the person skilled in the art will appreciate that the method can be scaled-up to any number of pixels. Each sampling window corresponds to a single pixel of the sub-sampled image. Thus, the sampling in this example reduces the number of pixels from 16 (in the source and intermediate images) to 4 (in each secondary image). FIG. 11B shows the first secondary image comprising four pixels having pixel values $C_{11}$, $C_{12}$, $C_{21}$, $C_{22}$ derived from the sampling shown in FIG. 11A. FIG. 12 shows a magnified view of the first sampling window, corresponding to top-left circle of FIG. 11A. The first sampling window samples a group of five unequally-spaced pixels having pixel values $P_1$, $P_2$, $P_5$, $P_6$ and $P_9$. As shown in FIG. 11A, the other sampling windows sample groups of a different number of unequally spaced pixels. In the illustrated example, it is assumed that the intensity of each spot has a Gaussian distribution. Accordingly, pixel values P of "inner pixels" (i.e. located near the centre of the sampling window) have a high weighting (e.g. "5"), and pixels values P of "outer pixels" (i.e. located near the edge of the sampling window) have a low weighting (e.g. "1"), according to a Gaussian distribution. Thus, a single sub-sampled pixel value $C_{11}$ of the secondary image, that is representative of the pixels of the warped image within the first sampling window, can be calculated. For example, the pixel value $C_{11}$ may be calculated as a function of the pixel values $P_1$, $P_2$, $P_5$, $P_6$ and $P_9$, such as the sum or average of the weighted pixel values $P_1$, $P_2$, $P_5$, $P_6$ and $P_9$. In some embodiments, the weighting technique assumes that the intensity of each pixel decreases from the centre of the sampling window in accordance with a Gaussian distribution. The technique may therefore include measuring the distance of each pixel from the centre of the sampling window and weighting the value assigned to that pixel (like the kernel method) based on the distance. For example, the grey level of each pixel may be multiplied a factor representative of the distance (again, based on a Gaussian distribution). Pixels may be included within a sampling window if the distance is less than a threshold value. Some pixels may be included in the calculation of more than one pixel of the secondary image. Some pixels may be included in the calculation of a pixel for a first secondary image and a second secondary image. The sampling windows shown are circular but other shapes may be employed.

Figures 13A, 13B:
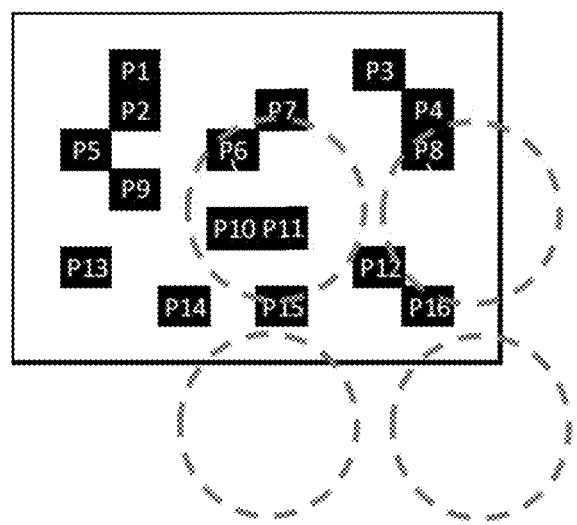
FIG. 13A shows sampling of the intermediate image of FIG. 10B to determine a second secondary image.
FIG. 13B shows the second secondary image, in accordance with embodiments.

FIG. 13A shows the sampling of the warped image of FIG. 10B to determine a second secondary image. In particular, the warped image is sub-sampled using the same group of four symmetrically arranged circular sampling windows (shown as circles) as in FIG. 11A. However, the position of the group of sampling windows used to derive the second secondary image is diagonally offset from, but partially overlaps, the position of the group of sampling windows used in FIG. 11A to derive the first secondary image. FIG. 13B shows the second secondary image comprising four pixel values $D_{11}$, $D_{12}$, $D_{21}$, $D_{22}$ derived from the sampling shown in FIG. 13A. Each pixel value D of the second secondary image is determined by assuming a Gaussian distribution, in the same way as the pixel values C of the first secondary image are determined, as described above with reference to FIGS. 11A and 12.

Warping Maps

Figure 14:
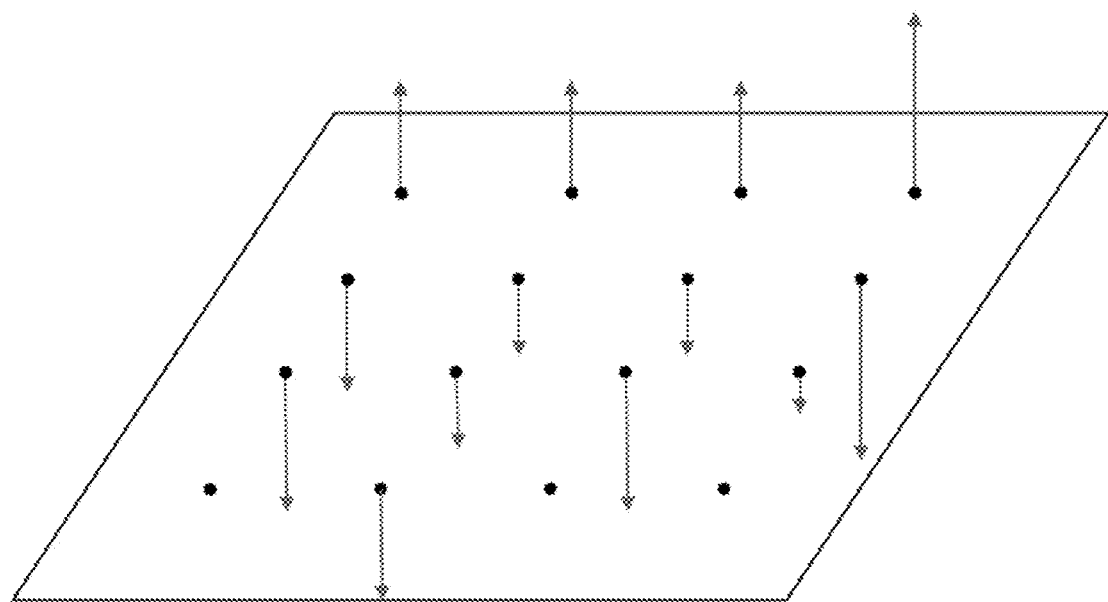
FIG. 14 illustrates an example displacement map.

FIG. 14 shows an example displacement map that may be used to determine a warped, intermediate image (e.g. FIG. 10B) corresponding to a source image (e.g. FIG. 10A). In particular, the map corresponds to the area of the replay field and the dots correspond to specific locations on the replay field. Downward arrows represent a negative displacement of the pixel due to warping, upward arrows represent a positive displacement of the pixel due to warping and the length of each arrow represents the magnitude of the displacement. FIG. 14 shows the displacement caused by warping in one direction (e.g. displacement in the x-direction). It will be appreciated that another displacement map is needed for the other direction (e.g. displacement in the y-direction). Accordingly, each displacement map may be used to determine the magnitude and direction of the displacement of pixels (in the x- and y-directions) based on their respective locations within the source/target image to derive a warped image. As described above, displacement maps can be determined by ray tracing and the like. In some embodiments, the displacement map is created by projecting an array of dots and using a camera to measure the displacement of each dot in the image formed by the optical system. In some embodiments, this process includes placing a screen showing the un-warped array of dots on the image plane (e.g. virtual image plane) of the optical system and using a camera to measure the actual displacement of each light dot from the position of the corresponding dot on the screen in order to provide the plurality of data points plotted in FIG. 14. The variable phase-ramp (software grating) function may be used as part of the measurement process—e.g. by determining the gradient of the phase-ramp function required to move a dot to the correct position. The reader will appreciate that such as process requires accurate positioning and calibration. A detailed description of the process is beyond the scope of this disclosure but, nevertheless, within the capabilities of the person skilled in the art. The techniques disclosed herein require warping maps and it is not relevant to the techniques of the present disclosure how those warping maps are formed. The person skilled in the art will appreciate that it is common in imaging to be provided with warping maps for image correction.

It will be appreciated that the displacements measurements in FIG. 14 provide information related to only specific points on the replay plane. In some embodiments, interpolation is used to derive a complete warping map from FIG. 14. Accordingly, all pixels—e.g. P1 to P16 of FIG. 10A—can be mapped to respective warped positions.

Figure 15:
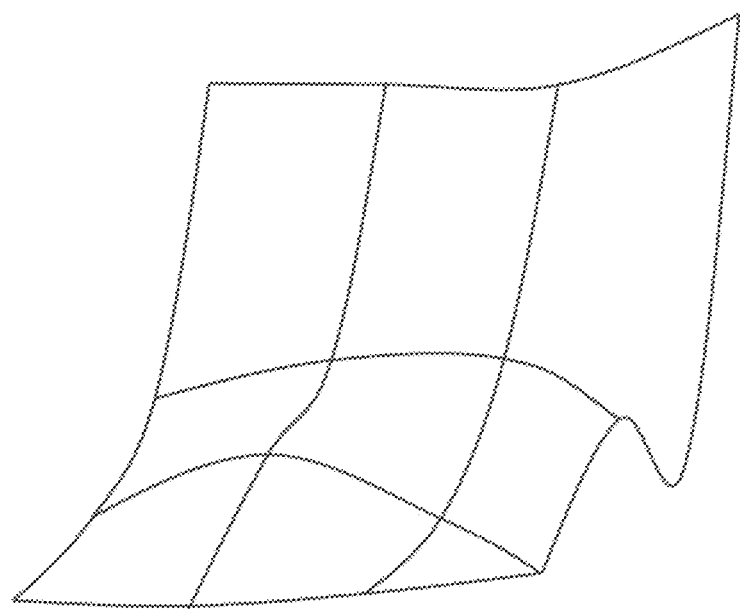
FIG. 15 illustrates another example displacement map.

FIG. 15 shows an example complete warping map that may be used to determine a warped intermediate image corresponding to a source image. In particular, the map shows a surface corresponding to the area of the replay field and the surface coordinates (up/down or the z-direction) correspond to the direction and magnitude of displacement caused by warping at the position. FIG. 15 shows the displacement caused by warping in one direction (e.g. displacement in the x-direction). It will be appreciated that another displacement map is needed for the other direction (e.g. displacement in the y-direction). Accordingly, each warping map may be used to determine the magnitude and direction of the displacement of pixels (in the x- and y-directions) based on their respective locations within the source/target image to derive a warped image which may be used as the basis of a method to compensate for warping as disclosed herein. As described above, warping maps can be determined by real-world measurements and interpolation.

As the reader will appreciate, a plurality of pairs (x and y) of warping maps may be provided for a corresponding plurality of eye-box positions (e.g. to accommodate tall or short viewers, different viewing positions etc). Accordingly, implementations may select one of a plurality of warping maps for use in sub-sampling a primary image in response to eye-tracking data.

Thus, a plurality of secondary images is generated by sampling (e.g. sub-sampling) the intermediate image using a sampling scheme (circular sampling windows). Each secondary image in this example comprises fewer pixels than the intermediate image, however other examples are contemplated in which each secondary image has the same number of pixels as, or more pixels than, an intermediate image. Furthermore, as shown in FIGS. 11B and 13B, each secondary image in this example has the same number of pixels (2×2 pixel array) as each of the respective other secondary images. A hologram is determined for each of the plurality of secondary images, and each hologram is displayed, on a display device to form a holographic reconstruction corresponding to each secondary image on a replay plane. Each hologram may be displayed in turn on a display device. Alternatively, or additionally, two or more display devices (or two or more zones or areas within the same display device) may be provided, to display two or more respective holograms concurrently.

When each of the plurality of holograms is displayed, in turn, on the display device, they are displayed within the integration time of the human eye, so that the holographic reconstructions thereof on the replay plane are "diagonally interlaced" and appear as a faithful and complete reconstruction of the source image. Accordingly, the holographic reconstruction of a second hologram corresponding to a second secondary image is spatially displaced on the replay plane relative to the holographic reconstruction of a first hologram corresponding to a first secondary image. In particular, the spatial displacement between the holographic reconstructions formed by displaying the first and second holograms comprises a diagonal offset. This may be achieved as described above. The amount of the displacement in each direction is chosen to correspond with the displacement between the first and second secondary images.

When each of the plurality of holograms is displayed on a different respective SLM (or within a different respective zone or area of the same SLM), at substantially the same time, the corresponding holographic reconstructions may be substantially overlapping. That is, the holographic reconstructions may be formed in a common area of the replay plane at substantially the same time and may be "diagonally interlaced" as detailed above. Thus, a viewer, observing the replay field on which the holographic reconstructions are formed, sees a single projected image rather than two separate projected images corresponding to multiple holographic reconstructions formed from different respective SLMs. The projected image therefore appears to be a faithful and complete reconstruction of the source image. Accordingly, there are disclosed herein techniques for "diagonal interlacing" of a plurality of holographic reconstructions corresponding to a source image, optionally, whilst compensating for warping by sub-sampling a warped version of the source image (i.e. an intermediate image). Owing to interlacing, each holographic reconstruction has fewer image spots, and thus a lower image spot density/resolution, than a single holographic reconstruction corresponding to the entire source image. This reduces the problem of inter-pixel interference and pixel crosstalk. Since the image spots of the respective holographic reconstructions are diagonally displaced, by moving the replay field on the replay plane, so that the image spots of one holographic reconstructions fills the gaps between the image spots of another holographic reconstruction, the perceived resolution of the device is not reduced by the interlacing process.

Accordingly, there is disclosed herein a method of holographic projection. The method receives a source image for projection, wherein the source image comprising pixels. The method generates a plurality of secondary images from the source image, wherein each secondary image may comprise fewer pixels than the source image. Each secondary image is generated by sampling a primary image, the primary image comprising one of: the source image and an intermediate image. The method further calculates a hologram corresponding to each secondary image to form a plurality of holograms. The method displays each hologram on a display device such as an SLM. Each hologram may be displayed in turn on a display device. Alternatively, or additionally, two or more display devices (or two or more areas or zones, with a common display device) may be provided, to display two or more respective holograms concurrently. The method Illuminates each hologram during display to form a holographic reconstruction corresponding to each secondary image on a replay plane.

Since the holographic reconstruction of a smaller hologram has fewer image spots in the same replay field size, the density of image spots, and thus the image resolution, is lower than for a larger hologram. Moreover, the signal-to-noise ratio (SNR) may be higher if more tiles of the smaller hologram are displayed in accordance with the chosen tiling scheme to improve pixel uniformity.

In consequence of these and other differences between smaller and larger holograms, it may be appropriate to use a different refresh rate for smaller holograms compared to larger holograms. For example, a part of the source image for which a smaller hologram (with lower resolution and potentially higher SNR depending on the chosen tiling scheme) is generated, could be refreshed at a higher speed or sub-frame rate than a part of the source image for which a larger hologram (with higher resolution and lower SNR) is generated. For instance, in a head-up display (HUD) application, for example for use in a moving vehicle, it may be desirable to display objects in the "near field" (appearing closer to the viewer) at a relatively low resolution but a relatively high refresh rate, whilst displaying objects in the "far field" (appearing further away to the viewer) at a relatively high resolution but at a relatively low refresh rate, or vice versa. As the skilled person will appreciate, other variations are possible in accordance with the present disclosure.

In some embodiments, there is provided a display device such as a head-up display comprising the holographic projector and an optical relay system. The optical relay system is arranged to form a virtual image of each holographic reconstruction. In some embodiments, the target image comprises near-field image content in a first region of the target image and far-field image content in a second region of the target image. A virtual image of the holographically reconstructed near-field content is formed a first virtual image distance from a viewing plane, e.g. eye-box, and a virtual image of the holographically reconstructed far-field content is formed a second virtual image distance from the viewing plane, wherein the second virtual image distance is greater than the first virtual image distance. In some embodiments, one hologram of the plurality of holograms corresponds to image content of the target image that will be displayed to a user in the near-field (e.g. speed information) and another hologram of the plurality of holograms corresponds to image content of the target image that will be projected into the far-field (e.g. landmark indicators or navigation indicators). The image content for the far-field may be refreshed more frequently than the image content for the near-field, or vice versa.

The approach disclosed herein provides multiple degrees of freedom, and thus a more flexible holographic projector. For example, the technique defining how the secondary images are derived from the source image may be dynamically varied. In particular, the primary image may be dynamically-changed in response to eye-tracking data by providing a warping map or warping map pair for a plurality of eye-box positions. An intermediate image (i.e. warped image) may be formed in real-time using the warping map/s. In the embodiments described in the next section, the image processing engine may dynamically change the scheme used to derive the secondary images from the source image, based on application requirements and/or external factors indicated by a control signal such as eye-tracking data. In addition, different tiling schemes may be used. A display engine (or tiling engine thereof) may dynamically change the tiling scheme used to display a hologram according to application requirements and/or external factors indicated by a control signal. This flexibility is highly valuable in a real-world projector, which may display different source images in a dynamically varying environment. For example, a holographic projector may be situated in a moving vehicle.

Sampling Based on Warping Map

Figure 17A:
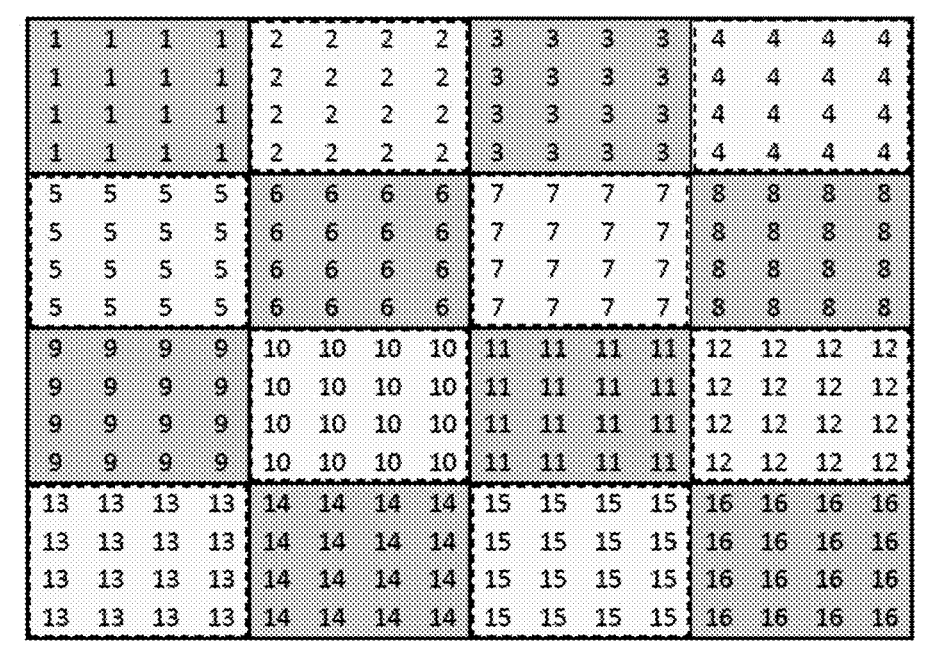
Figure 18:
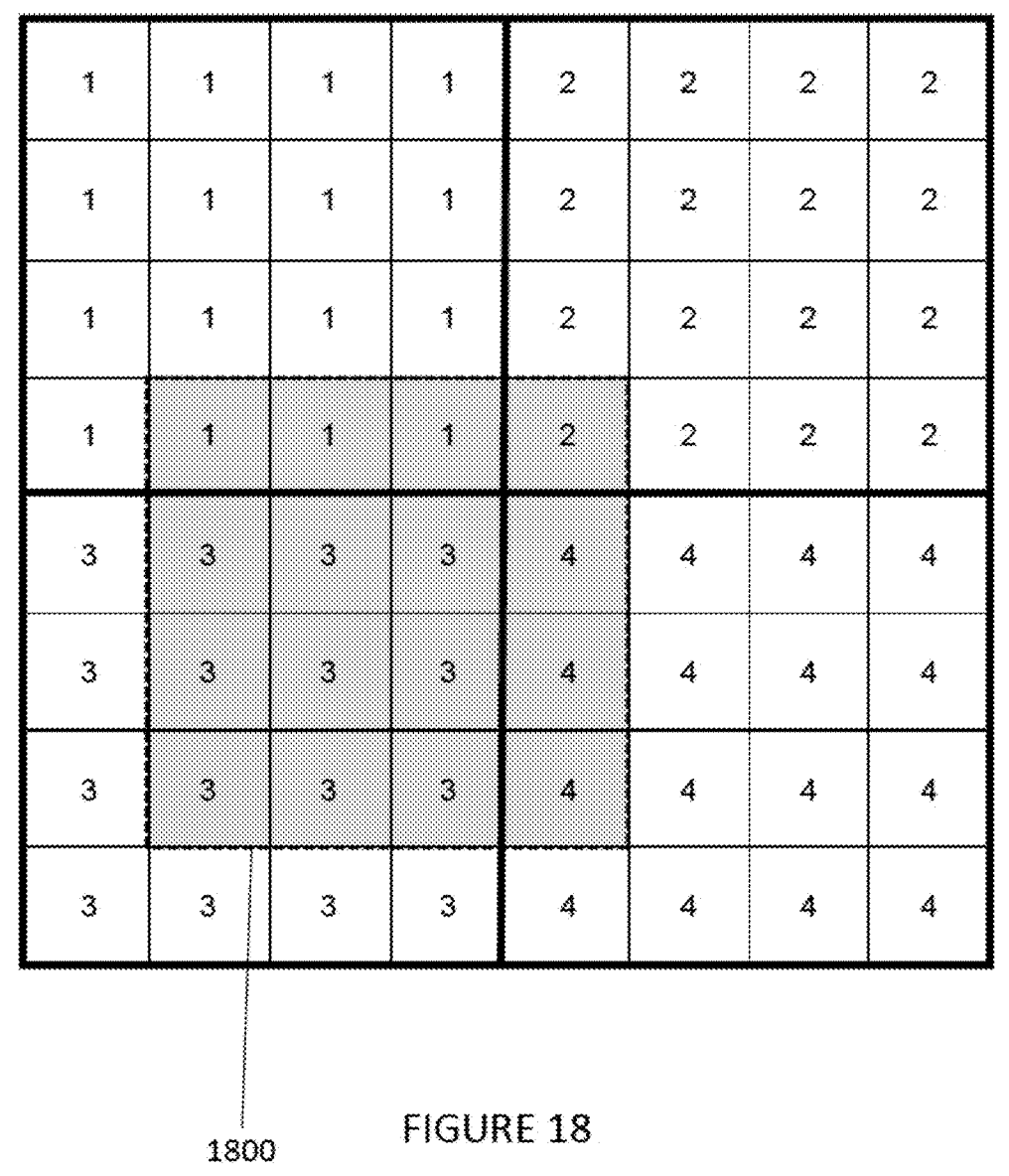

FIGS. 16 to 18 illustrate a technique for generating secondary images in accordance with another example. This technique also -samples (or "sub-samples") pixels of a high-resolution image (e.g. "upscaled" or "over-sampled" image), which forms a primary image. The sub-sampling process derives a plurality of secondary images from the source image, so that each secondary image may comprise fewer pixels than the source/primary image. For the avoidance of doubt, in the embodiments described in this section of the disclosure, the primary image is the same as the source image. The term "upscaled image" is used in this section of the disclosure to refer to the source/primary image.

Notably, in these embodiments, the sampling window positions used for sub-sampling groups of pixels of the primary image are determined based on the warping map/s.

Figure 16A:
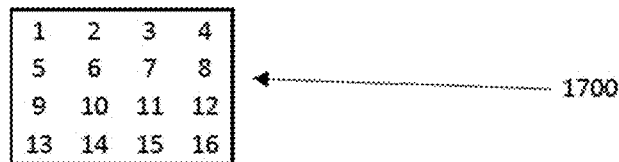
FIG. 16A shows a target image for projection and FIG. 16B shows an upscaled version of the target image in accordance with some embodiments.
Figure 16B:
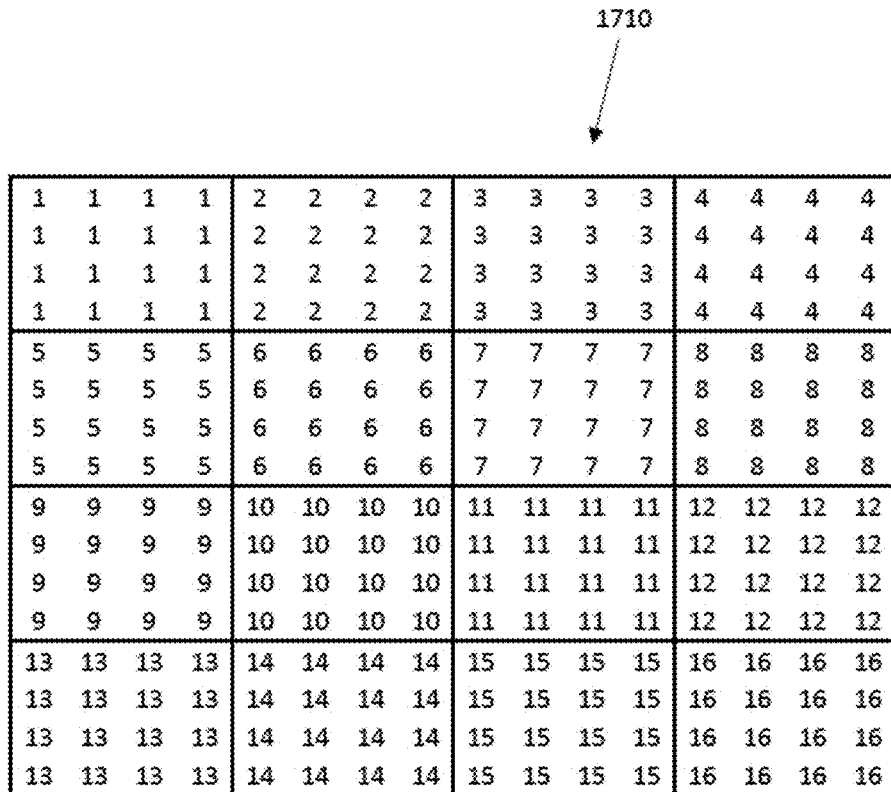

FIG. 16A shows an example target image 1600 comprising 16 pixels. The target image 1600 comprises a 4×4 array of pixels having pixel "1" to "16". FIG. 16B shows an over-sampled version 1610 of target image 1600 (herein "upscaled image"). Upscaled image 1610 has been over-sampled (or upscaled) by a factor of four in both the x- and y-directions. In particular, each pixel of the target image is repeated or replicated in a 4×4 array (herein "block") of the identical pixel value in upscaled image 1610. Thus, upscaled image 1610 comprises 64 pixels in a 16×16 array of pixels. The 16×16 array of pixels comprises 16 blocks of identical pixels, the pixels in each block replicating a respective pixel of source image 1600.

As described above, warping (image distortion due to displacement of pixels) may occur due to components of an optical relay system, which images the holographic reconstruction formed on the replay plane (e.g. a diffuser) to an eye-box region for a viewer. A displacement or warping map, as illustrated in FIGS. 14 and 15, may be used to determine the displacement of pixels caused by warping.

Accordingly, since the displacement of a pixel in the x- and y-directions caused by the warping effect is known, the displaced positions can be utilized for the purpose of sub-sampling to compensate for the warping effect. Accordingly, this technique samples (or sub-samples) groups of pixels (e.g. blocks comprising 4×4 pixel arrays) of the upscaled (source) image 1610 at displaced pixel positions to compensate for the warping effect.

Figure 17B:
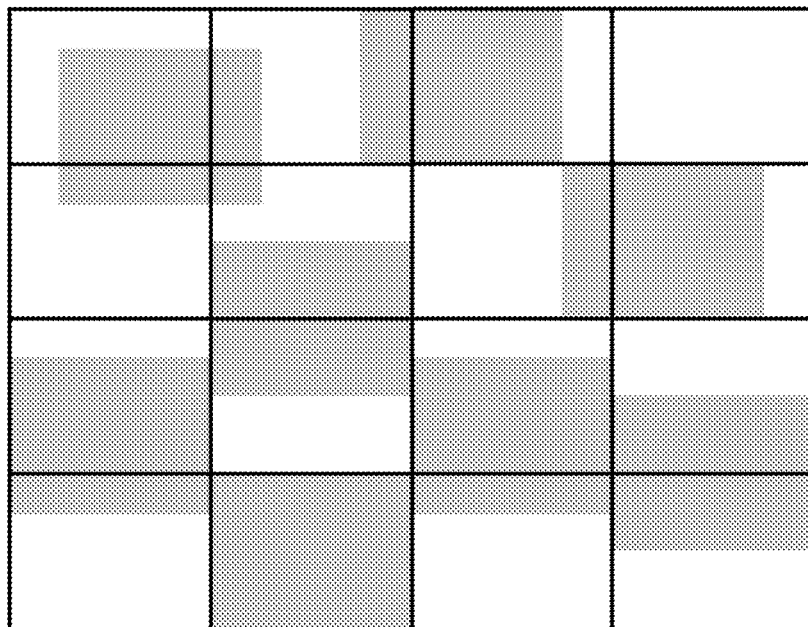
FIGS. 17B and 17C show how the different areas of the checkerboard are warped by optics of an optical system which images the holographic replay field.
Figure 17C:
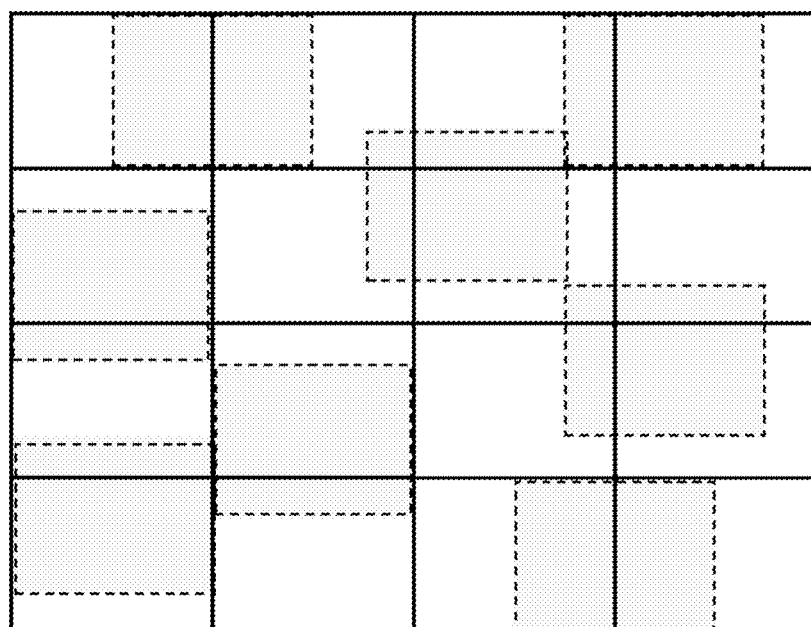

Referring to FIG. 17A, the upscaled image 1610 is sub-sampled to derive a plurality of secondary images, using the checkerboarding approach, as described above. In particular, a first set of eight blocks (4×4 pixel arrays) arranged in a first checkerboard pattern (dark shading in drawing) are selected to be sub-sampled to derive a first secondary image, and a second set of eight pixel blocks (4×4 pixel arrays) arranged in a second checkerboard pattern (light shading with dashed outlines in drawing), which is the inverse or opposite to the first checkerboard pattern, are selected to be sub-sampled to derive a second secondary image. FIG. 17B shows the displacement of each of the first set of pixel blocks according to the first checkerboard pattern, as determined by a displacement/warping map. Similarly, FIG. 17C shows the displacement of each of the second set of pixel blocks according to the second checkerboard pattern, as determined by the displacement/warping map. In each case, a pixel block (4×4 pixel array) is translated in the x- and y-directions by a defined amount. For example, the displacement/warping map may be used to define a set of coordinates in the warped image that can be used to determine a sampling position (e.g. a starting position of the sampling windows for image sampling). Thus, for example, the warping maps may indicate that the block of pixels "1" in the upscaled image 1610 will be displaced in the x- and y-directions (down and to the right in the drawing) by the optical relay system.

The upscaled image 1610 is sampled using a sampling window for a 4×4 array of pixels at a set of sampling window positions corresponding to the displaced positions shown in FIGS. 17B and 17C. Sampling at the displaced positions in FIG. 17B gives rise to a first secondary image and sampling at the displaced positions in FIG. 17C gives rise to a second secondary image. Thus, a single sampled pixel value for each pixel of each secondary image is derived from the pixel values of the pixels of the upscaled image 1610 falling within the corresponding sampling window. For example, a single sub-sampled pixel value may be determined as an (unweighted) average of the pixel values of the pixels of the upscaled image 1610 contained within the sampling window at the displaced position.

As the skilled person will appreciate, in contrast to the other techniques disclosed herein in which the sampling window positions may be predefined, the sampling window positions are calculated based on a displacement/warping map for the optical relay system. The warping map/s may be a function of eye-box position and so the sampling window positions may be dynamically-variable.

Accordingly, using the sampling scheme shown in FIGS. 17B and 17B, first and second secondary images are generated, each comprising 4×2 arrays of pixels, corresponding to the source image. The first and second secondary images automatically compensate for the warping effect, by virtue of the sampling scheme (i.e. the positions of the sampling windows). As described herein, first and second holograms H1 and H2 are calculated using the first and second secondary images. The first and second holograms H1 and H2 may be displayed on a spatial light modulator, in turn, within the integration time of the human eye, by "diagonal interlacing". Alternatively, they may be displayed substantially simultaneously on two different respective SLM's, or on two different areas or zones within a common SLM, and irradiated so as to produce their respective holographic reconstructions on a common area of the replay field, substantially overlapping with one another. Thus, a faithful reconstruction of the target image appears in the eye box region of a holographic projector, since the integrated holographic reconstruction formed by diagonal interlacing of the holographic reconstructions on the replay plane is compensated for a warping effect of the optical relay system (i.e. from the replay plane to the eye box region).

Although in the example described above relating to FIGS. 17A to 17C, a checkerboarding approach is used to derive secondary images, with the conventional checkerboarding sampling positions being warped by a warping map; it is also possible to apply a similar technique to a kernel-based approach for deriving secondary images. That is, a warping map may be applied to a plurality of 'un-warped' contiguous sampling window positions—such as those that are adopted by a kernel in the example of FIGS. 6 to 9 herein—in order to derive a 'warped' set of sampling window positions, for use in deriving secondary images that have a built-in warp correction, and therefore account for the image warping that an optical system may otherwise cause, to a source image.

FIG. 18 shows an example of a part of upscaled image 1610 overlaid with a sampling window 1800 or 'kernel'. This upscaled image 1610 is an upscaled version of a 2×2 target image (or 'original source image', not itself shown), which has been over-sampled (or upscaled) by a factor of four in both the x- and y-directions. As described previously, the sampling window 1800 captures a block (4×4 array) of pixels of the upscaled image 1610. FIG. 18 shows the sampling window 1800 at a first 'warped' sampling window position, which corresponds to the displacement of the first block of pixels "1" (and therefore corresponds to the displacement of a first 'un-warped' sampling window position) in the upscaled image 1610, calculated using the displacement/warping map. Thus, the sampling window 1800 overlays pixels of three adjacent blocks of pixels "2", "3" and "4" in addition to pixels of the block of pixels "1". In the illustrated example, using sampling window 1800 at this first warped sampling window position, the first pixel value for the secondary image is determined as the mean average of the pixel values of the pixels of the upscaled image 1610 that are contained within the sampling window (i.e. 1/16th of the sum of the values of the 16 pixels or 1/16 ((3×1)+(1×2)+(9×3)+(3×4))). The other pixel values for the secondary image can be calculated from the pixels that fall within the sampling window at each of the other warped sampling window positions.

In this example, the upscaled image 1610 is an upscaled version of a 2×2 target image (not itself shown), which has been over-sampled (or upscaled) by a factor of four in both the x- and y-directions, and the sampling window or 'kernel' is a 4×4 array, which produces a single pixel value of a secondary image, for every sampling window position that it occupies. Therefore, the sampling by the kernel effectively downscales the upscaled image by a factor of four in both the x- and y-directions. As a result, a single pixel of the sampled (i.e. secondary) image corresponds to a single pixel of the original source image 1600 (i.e. prior to over-sampling/upscaling). Thus, the resolution of original source image 1600 is maintained. It will be appreciated that this is just one example, and that different scaling may be applied for the upscaling of an original source image and/or that a different size or shape of sampling window may be used, in order to achieve a desired net ratio between the resolution of the original source image and the resolution of a secondary image that is derived therefrom.

In addition, implementations may be optimised for more efficient consumption of memory and processing resources than other techniques for compensating for warping. In particular, since the over-sampling technique to derive the upscaled image replicates pixels of the input image, the individual pixel values of the upscaled image need not be stored in memory. For example, consider an input image of 1024×1024 pixels that is over sampled to derive an upscaled image of 4096×4096 pixels. Storing the upscaled image in memory would undesirably increase the memory usage 16 fold. However, instead of storing the upscaled image, it is possible to create a simple memory-efficient addressing scheme. In particular, each pixel of the upscaled image will have 16 possible addresses, 4 in X and 4 in Y (corresponding to the 4×4 pixel array). Thus, an addressing scheme based on the two most significant bits of a four-bit mapping scheme can be used to identify each block or 4×4 array of identical pixels in the upscaled image. Accordingly, memory resource usage is minimised by using a binary mapping scheme for pixels, which may be used in the sub-sampling process. In addition, the technique of sampling a high-resolution image that has been over-sampled to a power of two, such as to the power of four as described herein, involves simple calculations using binary arithmetic. For example, addition of pixel values of 16 pixels, (contained in sampling window for a 4×4 pixel array), involves straightforward binary processing that can be performed quickly and efficiently, for example using a binary adder. Likewise, determining an average of the pixel values of 16 pixels within a sampling window also involves straightforward binary processing that can be performed quickly and efficiently, for example by discarding the four least significant bits.

As the skilled person will appreciate, many variations and modifications may be made to the above techniques for sub-sampling a primary image to generate a plurality of secondary images. For example, whilst the sampling window positions having a diagonal offset are described for the purpose of diagonal interlacing, a directional offset in only one direction (e.g. x or y direction) may be used.

In all of the embodiments described herein, the size and shape of a kernel, and/or of a sampling window, can differ from the specific examples which have been shown and described. A kernel, or a sampling window, does not have to comprise a regular geometric shape, nor does it have to have a size or a shape that resembles the configuration of the pixels in a primary/source image, which it samples, nor does it have to have a size or a shape that resembles the configuration of the pixels in a generated secondary image. For example, circular kernels/sampling windows, as shown in FIGS. 11A, 12 and 13A herein, may be used in any of the other respective embodiments. Any suitable mathematical rule or mapping scheme may be applied, to associate one or more pixels (or pixel positions) with a kernel or sampling window, in a given position. A kernel or sampling window may, at least in some arrangements, only partially overlay or encompass an image (or part of an image) or a pixel that it is sampling.

System Diagram

Figure 19:
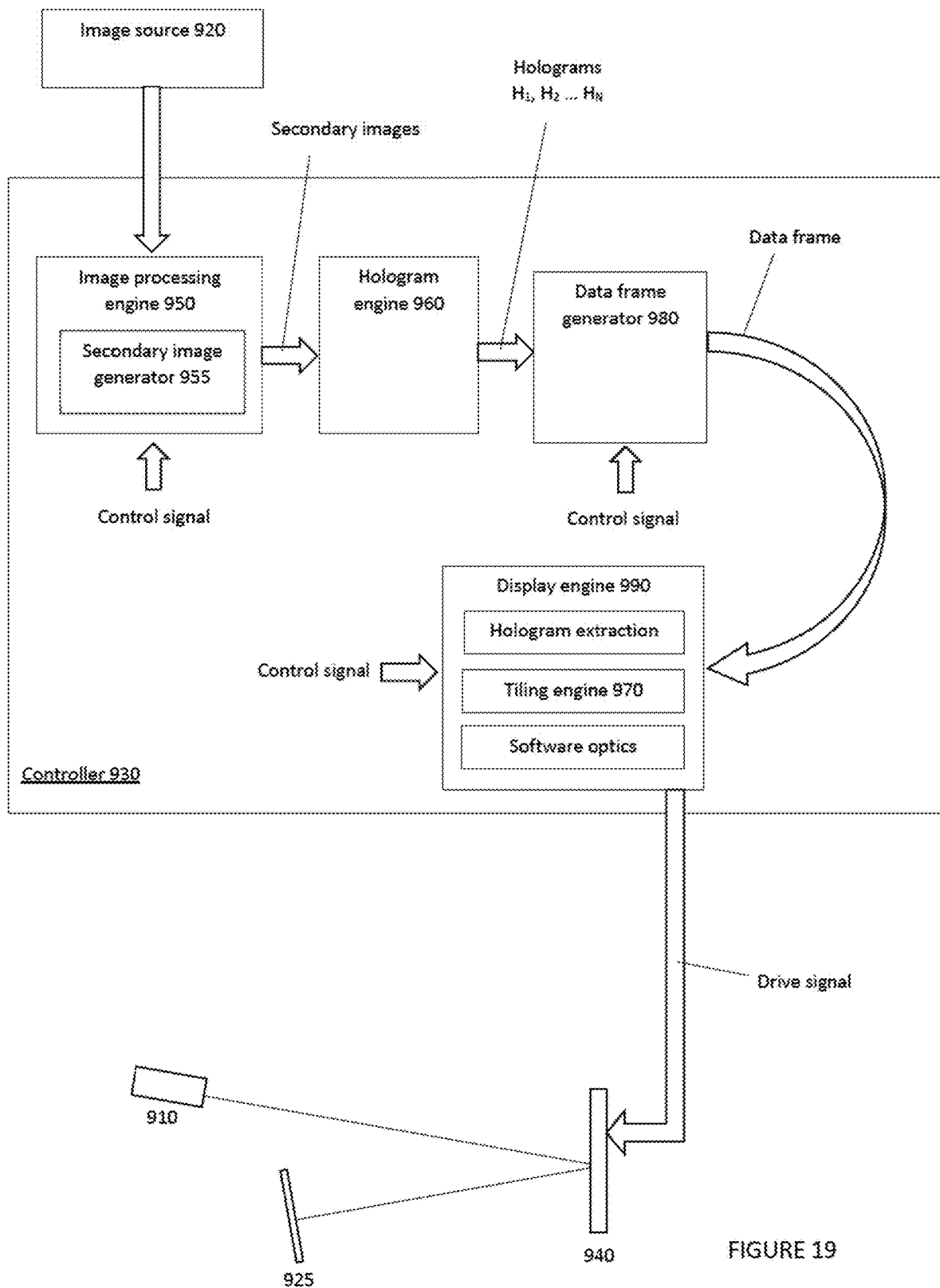
FIG. 19 is a schematic showing a holographic projector in accordance with embodiments.

FIG. 19 is a schematic showing a holographic system in accordance with embodiments. A spatial light modulator (SLM) 940 is arranged to display holograms received from a controller 930. In operation, a light source 910 illuminates the hologram displayed on SLM 940 and a holographic reconstruction is formed in a replay field on a replay plane 925. Controller 930 receives one or more images from an image source 920. For example, image source 920 may be an image capture device such as a still camera arranged to capture a single still image or video camera arranged to capture a video sequence of moving images.

Controller 930 comprises image processing engine 950, hologram engine 960, data frame generator 980 and display engine 990. Image processing engine 950 receives a source image from image source 920. Image processing engine 950 includes a secondary image generator 955 arranged to generate a plurality of secondary images from a primary image based on the source image in accordance with a defined scheme, as described herein. Image processing engine 950 may receive a control signal or otherwise determine the scheme for generating the secondary images. Thus, each secondary image may comprise fewer pixels than the source image. Image processing engine 950 may generate the plurality of secondary images using the source image as the primary image. The source image may be upscaled version of the target image, or the image processing engine may perform upscaling as described herein. Alternatively, image processing engine 950 may process the source image to determine an intermediate image, and use the intermediate image as the primary image. For example, the intermediate image may be an "warped image", as described herein. The warped image may be determined using a displacement map that comprises a displacement value for each pixel of the source image (e.g. in the x- and y-directions) representing the image distortion caused by an optical relay system arranged to image of each holographic reconstruction. Image processing engine 950 may generate the plurality of secondary images by sampling the primary image, as described herein. Image processing engine 950 may determine a first secondary image and a second secondary image, wherein the pixel value of each pixel of a first secondary image is calculated from a first group of pixels of the primary image and the pixel value of each pixel of a second secondary image is calculated from a second group of pixels of the primary image. In some implementations, the sampling window used to select the second group of pixels is offset from, and/or partially overlaps, the sampling window used to select the first group of pixels. In other implementations, the sampling window positions, in each case, may be arranged in a checkerboard pattern, where different checkerboard patterns are used for each secondary image. In some implementations, the sampling window positions for selecting the first and second groups of pixels are determined using a displacement map. Image processing engine 950 passes the plurality of secondary images to hologram engine 960.

Hologram engine 960 is arranged to determine a hologram corresponding to each secondary image, as described herein. Hologram engine 960 passes the plurality of holograms to data frame generator 980. Data frame generator 980 is arranged to generate a data frame (e.g. HDMI frame) comprising the plurality of holograms, as described herein. In particular, data frame generator 980 generates a data frame comprising hologram data for each of the plurality of holograms, and pointers indicating the start of each hologram. Data frame generator 980 passes the data frame to display engine 990. Display engine 990 is arranged to display each of the plurality of holograms, on SLM 940. The holograms may be displayed in turn and/or the SLM 940 may in fact comprise two or more SLM's, for displaying two or more respective holograms substantially concurrently, and/or two or more holograms may be displayed substantially concurrently on two or more distinct areas or zones of the SLM 940. Display engine 990 comprises hologram extractor 992, tiling engine 970 and software optics 994. Display engine 990 extracts each hologram from the data frame using hologram extractor 992 and tiles the hologram according to a tiling scheme generated by tiling engine 970, as described herein. In particular, tiling engine 970 may receive a control signal to determine the tiling scheme, or may otherwise determine a tiling scheme for tiling based on the hologram. Display engine 990 may optionally add a phase ramp function (software grating function also called a software lens) using software optics 994, to translate the position of the replay field on the replay plane, as described herein. Accordingly, for each hologram, display engine 990 is arranged to output a drive signal to SLM 940 to display each hologram of the plurality of holograms, according to a corresponding tiling scheme, as described herein.

Controller 930 may dynamically control how secondary image generator 955 generates secondary images, as described herein. Controller 930 may dynamically control the refresh rate for holograms. As described herein, the refresh rate may be considered as the frequency at which a hologram is recalculated by hologram engine, from a next source image in a sequence received by image processing engine 950 from image source 920. As described herein, dynamically controllable features and parameters may be determined based on external factors indicated by a control signal. Controller 930 may receive control signals relating to such external factors, or may include modules for determining such external factors and generating such control signals, accordingly.

As the skilled person will appreciate, the above-described features of controller 930 may be implemented in software, firmware or hardware, and any combination thereof.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. In some embodiments, the light receiving surface is a diffuser surface or screen such as a diffuser. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affect by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focussed at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

The size of the holographic replay field (i.e. the physical or spatial extent of the holographic reconstruction) is determined by the pixel spacing of the spatial light modulator (i.e. the distance between adjacent light-modulating elements, or pixels, of the spatial light modulator). The smallest feature which may be formed on the replay field may be called a "resolution element", "image spot" or an "image pixel". Typically, each pixel of the spatial light modulator has a quadrangular shape. The Fourier transform of a quadrangular aperture is a sinc function and therefore each image pixel is a sinc function. More specifically, the spatial intensity distribution of each image pixel on the replay field is a sinc function. Each sinc function may be considered as comprising a peak-intensity primary diffractive order and a series of decreasing-intensity higher diffractive orders extending radially away from the primary order. The size of each sinc function (i.e the physical or spatial extent of each sinc function) is determined by the size of the spatial light modulator (i.e. the physical or spatial extent of the aperture formed by the array of light-modulating elements or spatial light modulator pixels). Specifically, the larger the aperture formed by the array of light-modulating pixels, the smaller the image pixels. It is usually desirable to have small image pixels.

In some embodiments, the technique of "tiling" is implemented to increase image quality. Specifically, some embodiments implement the technique of tiling to minimise the size of the image pixels whilst maximising the amount of signal content going into the holographic reconstruction.

In some embodiments, the holographic pattern written to the spatial light modulator comprises at least one whole tile (that is, the complete hologram) and at least one fraction of a tile (that is, a continuous subset of pixels of the hologram).

The holographic reconstruction is created within the zeroth or primary diffraction order of the overall window defined by the spatial light modulator. It is preferred that the first and subsequent orders are displaced far enough so as not to overlap with the image and so that they may be blocked using a spatial filter.

In embodiments, the holographic reconstruction is colour. In examples disclosed herein, three different colour light sources and three corresponding SLMs are used to provide composite colour. These examples may be referred to as spatially-separated colour, "SSC". In a variation encompassed by the present disclosure, the different holograms for each colour are displayed on different area of the same SLM and then combining to form the composite colour image. However, the skilled person will understand that at least some of the devices and methods of the present disclosure are equally applicable to other methods of providing composite colour holographic images.

One of these methods is known as Frame Sequential Colour, "FSC". In an example FSC system, three lasers are used (red, green and blue) and each laser is fired in succession at a single SLM to produce each frame of the video. The colours are cycled (red, green, blue, red, green, blue, etc.) at a fast enough rate such that a human viewer sees a polychromatic image from a combination of the images formed by three lasers. Each hologram is therefore colour specific. For example, in a video at 25 frames per second, the first frame would be produced by firing the red laser for 1/75th of a second, then the green laser would be fired for 1/75th of a second, and finally the blue laser would be fired for 1/75th of a second. The next frame is then produced, starting with the red laser, and so on.

An advantage of FSC method is that the whole SLM is used for each colour. This means that the quality of the three colour images produced will not be compromised because all pixels of the SLM are used for each of the colour images. However, a disadvantage of the FSC method is that the overall image produced will not be as bright as a corresponding image produced by the SSC method by a factor of about 3, because each laser is only used for a third of the time. This drawback could potentially be addressed by overdriving the lasers, or by using more powerful lasers, but this would require more power to be used, would involve higher costs and would make the system less compact.

An advantage of the SSC method is that the image is brighter due to all three lasers being fired at the same time. However, if due to space limitations it is required to use only one SLM, the surface area of the SLM can be divided into three parts, acting in effect as three separate SLMs. The drawback of this is that the quality of each single-colour image is decreased, due to the decrease of SLM surface area available for each monochromatic image. The quality of the polychromatic image is therefore decreased accordingly. The decrease of SLM surface area available means that fewer pixels on the SLM can be used, thus reducing the quality of the image. The quality of the image is reduced because its resolution is reduced. Embodiments utilise the improved SSC technique disclosed in British patent 2,496, 108 which is hereby incorporated in its entirety by reference.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A holographic projector arranged to project a target image, the holographic projector comprising:
    an image processing engine arranged to:
        provide a primary image;
        generate a first secondary image comprising a first plurality of secondary image pixels by sampling the primary image according to a first sampling scheme having a plurality of first sampling windows each having a first sampling window position, each secondary image pixel of the first secondary image corresponding to one of the first sampling windows and having a pixel value that is calculated from pixel values of a group of primary image pixels of the primary image that fall within a corresponding first sampling window at a respective first sampling window position in accordance with the first sampling scheme; and
        generate a second secondary image comprising a second plurality of secondary image pixels by sampling the primary image according to a second sampling scheme having a plurality of second sampling windows each having a second sampling window position, each secondary image pixel of the second secondary image corresponding to one of the second sampling windows and having a pixel value that is calculated from pixel values of a group of primary image pixels of the primary image that fall within a corresponding second sampling window at a respective second sampling window position in accordance with the second sampling scheme, the second sampling scheme being substantially different from the first sampling scheme; and
    a hologram engine arranged to:
        determine a first hologram corresponding to the first secondary image to form a first hologram comprising a first set of hologram pixels; and
        determine a second hologram corresponding to the second secondary image to form a second hologram comprising a second set of hologram pixels;
    a display engine arranged to display the first hologram and the second hologram on a display device, and
    a light source arranged to illuminate the first hologram and the second hologram during display to form a first holographic reconstruction corresponding to the first secondary image on a replay plane and a second holographic reconstruction corresponding to the second secondary image on the replay plane.

2. The holographic projector as claimed in claim 1, wherein the image processing engine is arranged such that the first and second secondary images each have fewer pixels than the primary image.

3. The holographic projector as claimed in claim 1, wherein the display engine is arranged to display the first hologram and the second hologram in turn on the display device; or wherein the display device is arranged to display each hologram substantially simultaneously on different respective areas of the display device; or wherein a plurality of display devices is provided and wherein the display engine is arranged to display each hologram substantially simultaneously on different respective display devices, within the plurality of display devices.

4. The holographic projector as claimed in claim 1, wherein the image processing engine is arranged such that there is a positional correspondence between each first image pixel of the first secondary image and a respective group of image pixels of the primary image and/or the respective first sampling window.

5. The holographic projector as claimed in claim 1, wherein the image processing engine is arranged such that the primary image is an intermediate image based on a source image, wherein the image processing engine is arranged to process a source image using a displacement map to form the intermediate image, wherein the displacement map comprises a displacement value for each source image pixel of the source image representing the warping image distortion caused by an optical relay system arranged to form an image of each of the first and second holographic reconstructions.

6. The holographic projector as claimed in claim 1, wherein the image processing engine is arranged such that
    for each first sampling window the group of primary image pixels of the primary image that fall within the respective first sampling window form a corresponding, image pixel block, and for each second sampling window the group of primary image pixels of the primary image that fall within the respective second sampling window form a corresponding image pixel block; and
    a first set of image pixel blocks corresponding to the first sampling windows of the first sampling scheme are arranged in a first checkerboard pattern, and a second set of image pixel blocks corresponding to the second sampling windows of second first sampling scheme are arranged in a second checkerboard pattern that is opposite to the first checkerboard pattern.

7. The holographic projector as claimed in claim 1, wherein the image processing engine is arranged to generate additional secondary images.

8. The holographic projector as claimed in claim 1, arranged such that each hologram of the first and second holograms is displayed at a speed such that the holographic reconstructions thereof are formed within the integration time of the human eye.

9. The holographic projector as claimed in claim 1, arranged such that the display device is controllable to display a first hologram to form a first holographic reconstruction corresponding to the first secondary image and a second hologram to form a second holographic reconstruction corresponding to the second secondary image, wherein the first holographic reconstruction is spatially-displaced on the replay plane relative to a second holographic reconstruction in order to interlace the first holographic reconstruction and the second holographic reconstruction.

10. The holographic projector as claimed in claim 1, arranged such that the first and second holograms can be displayed so that the second holographic reconstruction hologram is spatially displaced on the replay plane by an offset relative to the first holographic reconstruction.

11. A method of holographically-projecting a reconstruction of a target image, the method comprising:
providing a primary image derived from the target image, the primary image comprising a plurality of primary image pixels, each primary image pixel having a pixel value;
generating a first secondary image comprising a first plurality of secondary image pixels by sampling the primary image according to a first sampling scheme having a plurality of first sampling windows each having a first sampling window position, each secondary image pixel of the first secondary image corresponding to one of the first sampling windows and having a pixel value that is calculated from pixel values of a group of primary image pixels of the primary image that fall within a corresponding first sampling window at a respective first sampling window position in accordance with the first sampling scheme;
generating a second secondary image comprising a second plurality of secondary image pixels by sampling the primary image according to a second sampling scheme having a plurality of second sampling windows each having a second sampling window position, each secondary image pixel of the second secondary image corresponding to one of the second sampling windows and having a pixel value that is calculated from pixel values of a group of primary image pixels of the primary image that fall within a corresponding second sampling window at a respective second sampling window position in accordance with the second sampling scheme, the second sampling scheme being substantially different from the first sampling scheme; and
calculating a first hologram corresponding to the first secondary image to form a first hologram comprising a first set of hologram pixels;
calculating a second hologram corresponding to the second secondary image to form a second hologram comprising a second set of hologram pixels;
displaying the first hologram on a display device;
illuminating the first hologram during display to form a first holographic reconstruction corresponding to the first secondary image on a replay plane; and
illuminating the second hologram during display to form a second holographic reconstruction corresponding to the second secondary image on the replay plane.

12. The method of claim 11, wherein the step of displaying the first hologram and the step of displaying the second hologram comprises any one or more of: displaying the first hologram and the second hologram in turn on the display device; or displaying the first hologram and the second hologram substantially simultaneously on different respective areas of the display device; or displaying the first hologram and the second hologram substantially simultaneously on different respective display devices, within a plurality of display devices.

13. The method of claim 11, further comprising:
receiving the target image for projection; and
upscaling the target image to form a source image having more image pixels than the target image, wherein the primary image is derived from the source image.

14. The method as claimed in claim 13, wherein upscaling comprises repeating a pixel value of each target image pixel the target image in a respective contiguous group of source image pixels of the source image, wherein there is a positional correspondence between each target image pixel of the target image and the corresponding group of source image pixels of the source image having the same pixel value.

15. The method as claimed in claim 13, wherein the primary image is the source image.

16. The method as claimed in claim 13, further comprising processing the source image using a displacement map to form an intermediate image as the primary image, wherein the displacement map comprises a displacement value for each source image pixel of the source image, the displacement map representing the warping image distortion caused by an optical relay system arranged to form an image of each holographic reconstruction.

17. The method as claimed in claim 11, wherein the pixel value of each secondary image pixel of the first secondary image and each pixel value of each secondary image pixel of the second secondary image is calculated by individually weighting the pixel values of the respective group of primary image pixels of the primary image falling within the respective sampling window.

18. The method as claimed in claim 11, wherein the second sampling window position of each second sampling window of the second plurality of sampling windows of the second sampling scheme is diagonally offset from a first sampling window position of a corresponding first sampling window of the first plurality of sampling windows.

19. The method as claimed in claim 11, wherein each second sampling window of the second plurality of sampling windows partially overlaps a corresponding first sampling window of the first plurality of sampling windows.

20. The method as claimed in claim 11, wherein the step of displaying comprises displaying the first and second holograms so that the holographic reconstruction of the second hologram is spatially displaced on the replay plane by an offset relative to the holographic reconstruction of the first hologram.

21. The method as claimed in claim 11, wherein the plurality of first sampling windows are interposed with respect to the plurality of second sampling windows.

* * * * *